United States Patent [19]
Tsuji et al.

[11] Patent Number: 4,763,998
[45] Date of Patent: Aug. 16, 1988

[54] COMPACT ZOOM LENS

[75] Inventors: Sadahiko Tsuji, Kanagawa; Muneharu Sugiura, Tokyo; Kazuo Tanaka, Tokyo; Masatake Kato, Tokyo, all of Japan

[73] Assignee: Canon Kabushiki Kaisha, Tokyo, Japan

[21] Appl. No.: 877,101

[22] Filed: Jun. 23, 1986

[30] Foreign Application Priority Data

Jun. 26, 1985 [JP] Japan ................... 60-139382
Jun. 26, 1985 [JP] Japan ................... 60-139383
Jun. 26, 1985 [JP] Japan ................... 60-139384
Jun. 26, 1985 [JP] Japan ................... 60-139385
Jun. 26, 1985 [JP] Japan ................... 60-139386

[51] Int. Cl.$^4$ .................. G02B 15/14; G02B 9/64
[52] U.S. Cl. .................................... 350/427
[58] Field of Search ..................... 350/427, 423

[56] References Cited

U.S. PATENT DOCUMENTS 4,256,381  3/1981  Kreitzer ................ 350/423
4,439,017  3/1984  Yamaguchi ............ 350/427

Primary Examiner—John A. Corbin
Assistant Examiner—Rebecca D. Gass
Attorney, Agent, or Firm—Fitzpatrick, Cella Harper & Scinto

[57] ABSTRACT

A zoom lens comprising a first lens unit of positive refractive power for focusing, a second unit of negative refractive power movable for zooming in a mono-direction throughout, a third unit of positive refractive power movable for zooming in the opposite mono-direction to that of movement of the second unit, and a fourth unit of positive refractive power having an image forming function which is held stationary during zooming, with a diaphragm being arranged in between the second and third units to be stationary.

7 Claims, 27 Drawing Sheets

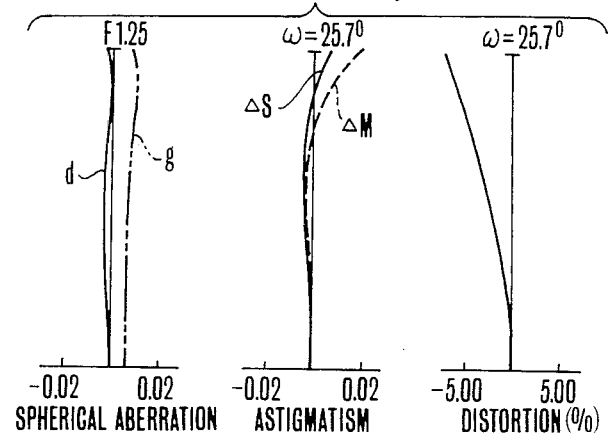
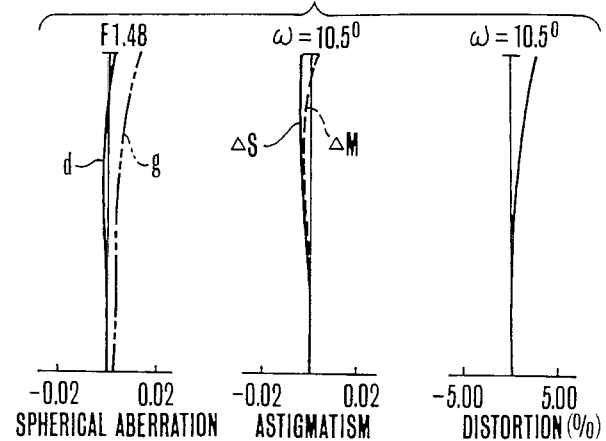
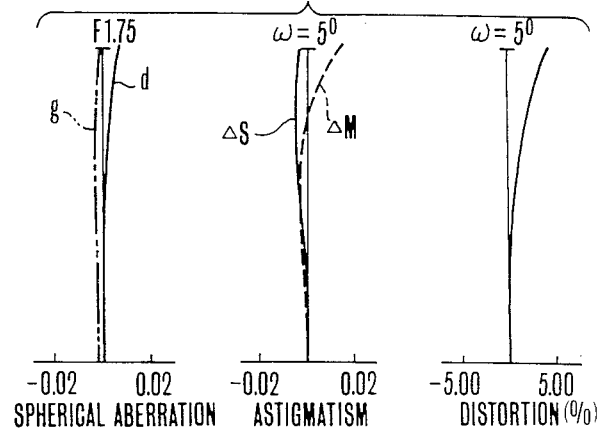

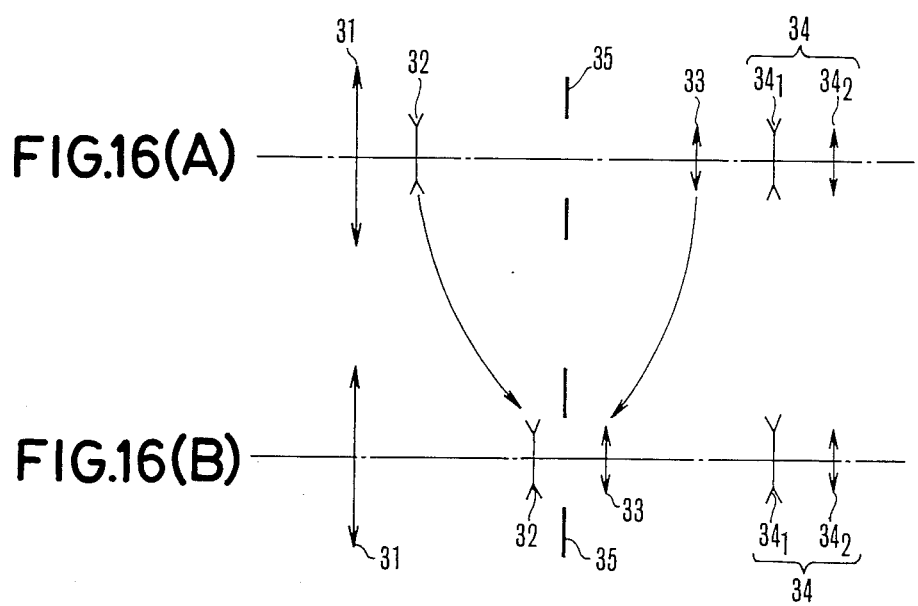
FIG.16(A)
FIG.16(B)
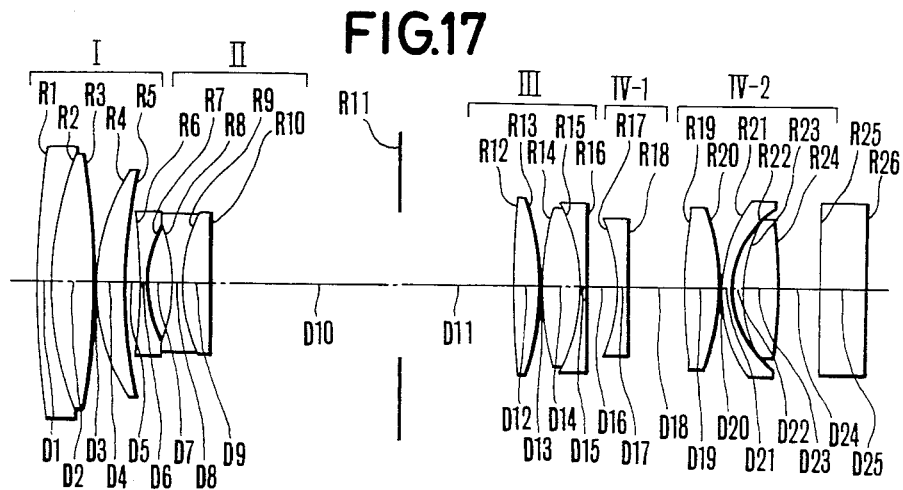
FIG.17

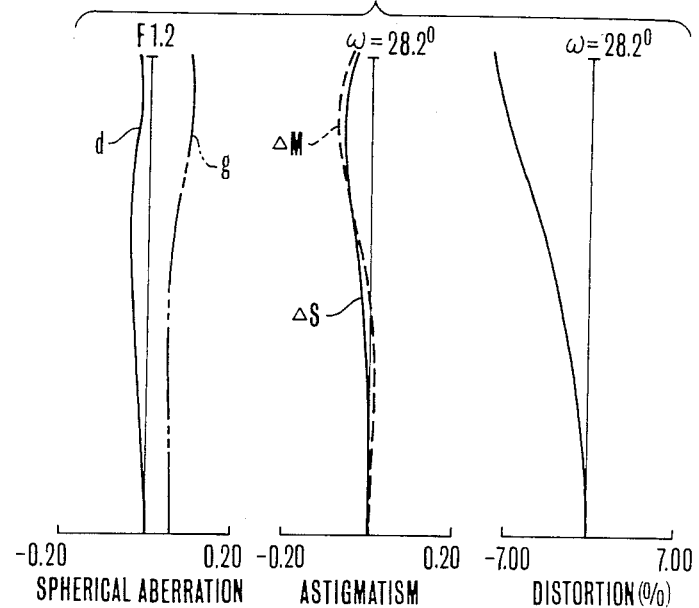
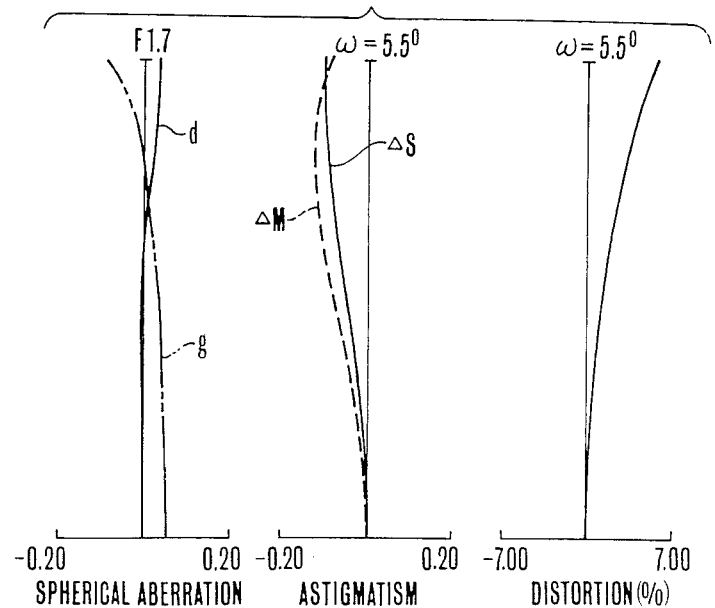

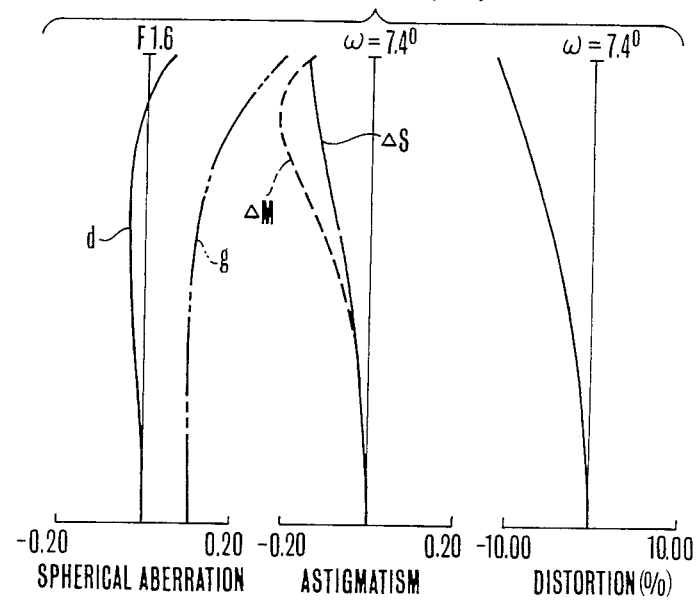
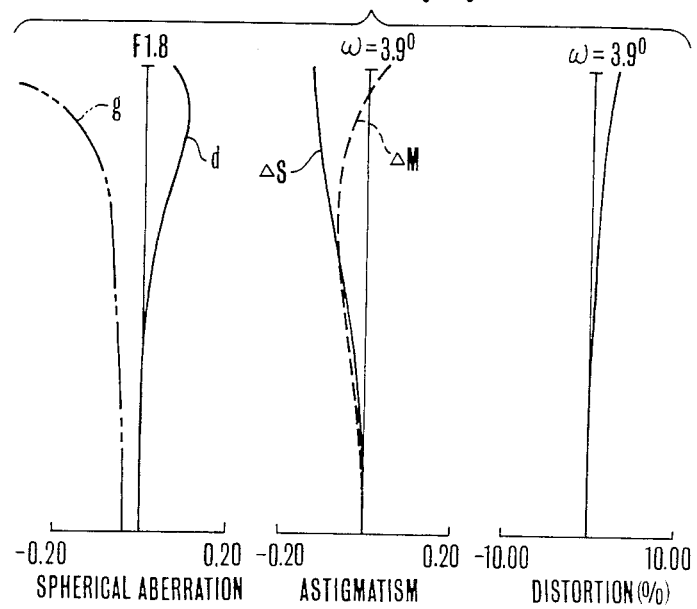

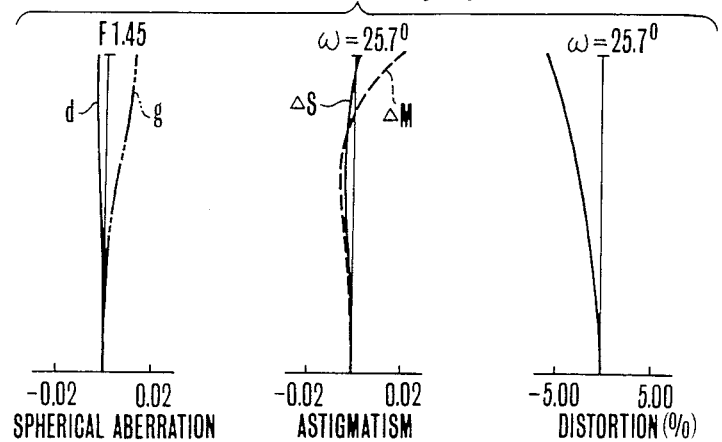
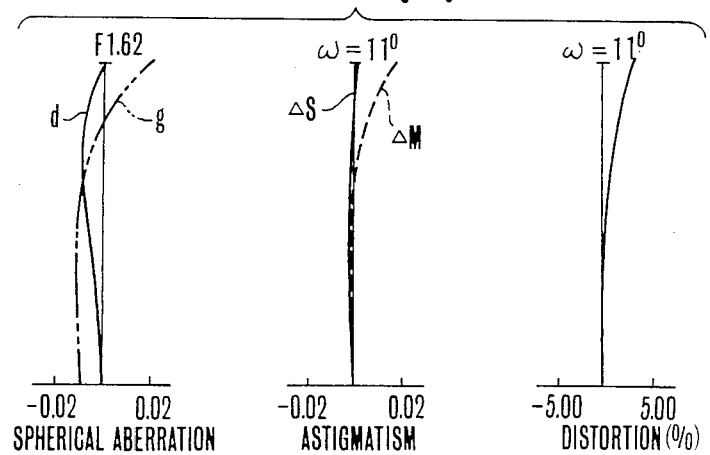
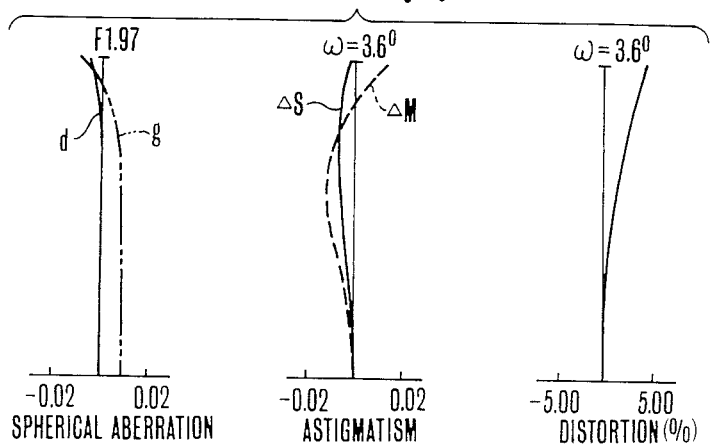

COMPACT ZOOM LENS

BACKGROUND OF THE INVENTION

1. Field of the Invention

This invention relates to compact zoom lenses, and more particularly to compact zoom lenses of large zoom ratio with a reduced weight of the entire lens system suited to still cameras and video cameras.

2. Description of the Related Art

An example of the conventional comparatively high range zoom lens adapted to be used in a photographic camera or video camera is shown in FIG. 1, and comprises a first unit 11 of positive refractive power for focusing, a second unit 12 of negative refractive power movable for zooming in a mono-direction throughout, a third unit 13 of negative refractive power movable for zooming in a forward-and-rearward direction to compensate for image shift, a fourth unit 14 of positive refractive power which is not always necessary but is stationary during zooming so that the emerging rays are almost afocal, and a fixed fifth unit 15 of positive refractive power. A diaphragm 16, in most cases, is arranged in between the third and fourth, or fourth and fifth units. This type of zoom lens has an advantage that the physical length of the entire system can be minimized because the spaces in which the second and third units move for zooming respectively can be partly overlapped. To achieve a further minimization of the physical length, the refractive power of the second unit 12 must be strengthened as much as possible so that the total zooming movement of the second unit 12 is much reduced. The increase in the power of the second unit 12, however, gives rise to problems that fluctuation of aberrations with zooming is increased, and that the manufacturing accuracy is required to be set at a higher level. Besides these, the long-time investigation and experience of the inventor has proven that when the power of the second unit is too strong, the lens thickness must be increased in view of the minimum acceptable edge thickness of the lens, and, in some cases, therefore, the physical length of the entire system is, on the contrary, increased. Hence, the refractive power of the second unit cannot be greatly strengthened.

As for an increase of the angular field by shortening the minimum focal length, because the oblique pencil comes in on determination of the diameter of the first unit, the wider the angle of field, the larger the diameter of the first unit becomes. Thus, the entire system is increased in the lateral direction. On the other hand, when the focal length for the wide angle end is shifted to longer ones, whichever, the oblique light bundle near or at the wide angle end, or the axial maximum light bundle at the telephoto end, has a larger diameter and determines the diameter of the first unit. With the prescribed zoom ratio when preserved, the focal length for the telephoto end becomes too long. This leads to an increase in the diameter of the first unit.

Another disadvantage of the type of zoom lens shown in FIG. 1 is that because the second and third units both are negative in refractive power, the axial rays emerging from the zoom section diverge so that the diameter of the aperture of the diaphragm that follows it tends to increase. In general, it is in the nature of zoom lenses that as the focal length increases, the diameter of the aperture of the diaphragm increases to maintain the constant speed of the entire system. Also, the required diameter of the casing for the diaphragm is equal to about 2 times the maximum value of the aperture diameter. When in designing a compact lens, it is, therefore, not preferable to choose such a type that the longest focal length of the entire system should be shifted toward longer ones.

Meanwhile, Japanese Patent Publication No. SHO 51-12424 has proposed another type of 5-unit zoom lens in which as shown in FIG. 2, the sign of refractive power of the third unit 23 is changed to positive, and the direction of its movement is made monotonous and opposite to that of movement of the negative second unit 22 in order to achieve an increase in the zoom ratio. In FIG. 2, 21 is the first unit for focusing; 24 is the fourth unit for making almost afocal the rays of light passed through the first to third units; 25 is the fifth unit having the image forming function; 27 is an optical member for splitting off part the light to a finder; 26 is the diaphragm. In the zoom lens of FIG. 2, the rays of light emerging from the third unit become somewhat convergent, thereby giving an advantage that the diaphragm is sufficient with a comparatively small maximum diameter of aperture. However, in order to reduce the diameter of the first unit, the separation between the second and third units must be somewhat increased. As a result, the physical length of the entire system becomes longer. Also, the diameter of the third unit is caused to increase. In order to reduce the physical length of the entire system, the refractive powers of the second and third units may be strengthened to decrease the total zooming movements of both of them. But, the increase in the power leads to increase the fluctuation of the aberration with zooming. On this account, the power cannot be too much strengthened.

SUMMARY OF THE INVENTION

An object of the invention is to facilitate a much-desired shortening of the total length of the zoom lens.

Another object is to achieve a shortening of the diameter of the first lens unit with a decrease of the weight thereof.

Still another object is to provide a zoom lens whose bulk and size is greatly reduced, while nevertheless permitting good correction of various aberrations to be achieved.

BRIEF DESCRIPTION OF THE DRAWINGS

FIGS. 10(A), 10(B), 10(C) to 15(A), 15(B), 15(C) are graphic representations of the various aberrations of the zoom lenses of FIGS. 4 to 9 respectively.

FIGS. 16(A) and 16(B) are schematic diagrams of the power arrangement of another zoom lens of the invention.

FIGS. 17 to 21 are block diagrams of five specific examples 7-11 of zoom lenses of the invention respectively.

FIGS. 22(A), 22(B) to 26(A), 26(B) are graphic representations of the various aberrations of the zoom lenses of FIGS. 17 to 21 respectively.

FIGS. 33(A), 33(B), 33(C) to 38(A), 38(B), 38(C) are graphic representations of the various aberrations of the zoom lenses of FIGS. 27 to 32 respectively.

DETAILED DESCRIPTION OF THE PREFERRED EMBODIMENTS

Figure 3:
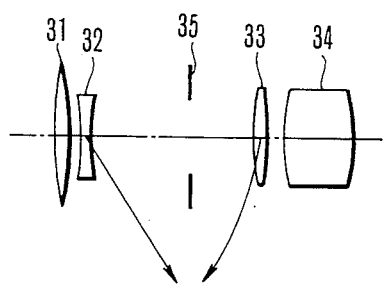
FIG. 3 is a schematic sectional view of the predesign of a zoom lens according to the present invention.
Figure 4:
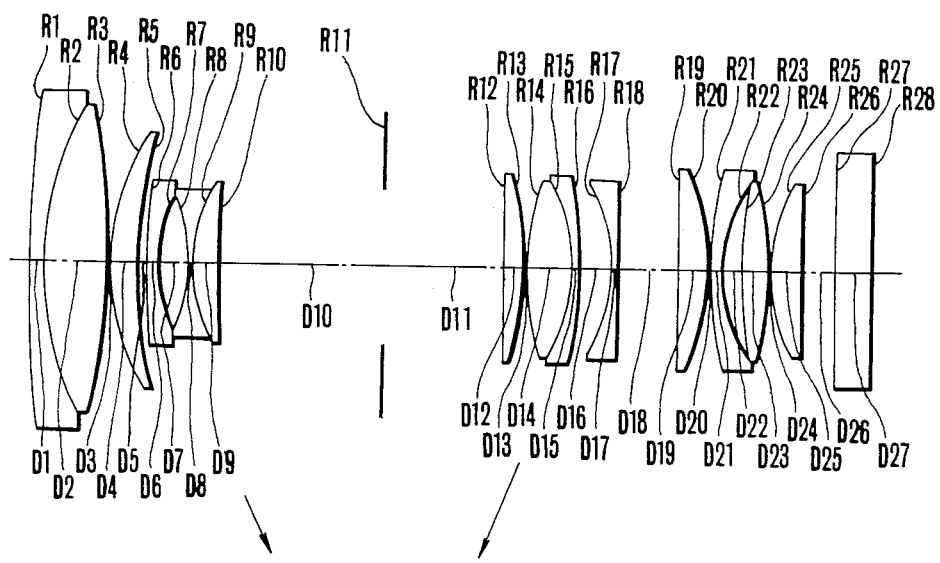
FIGS. 4 to 9 are block diagrams of six specific examples 1-6 of zoom lenses of the invention respectively.
Figure 5:
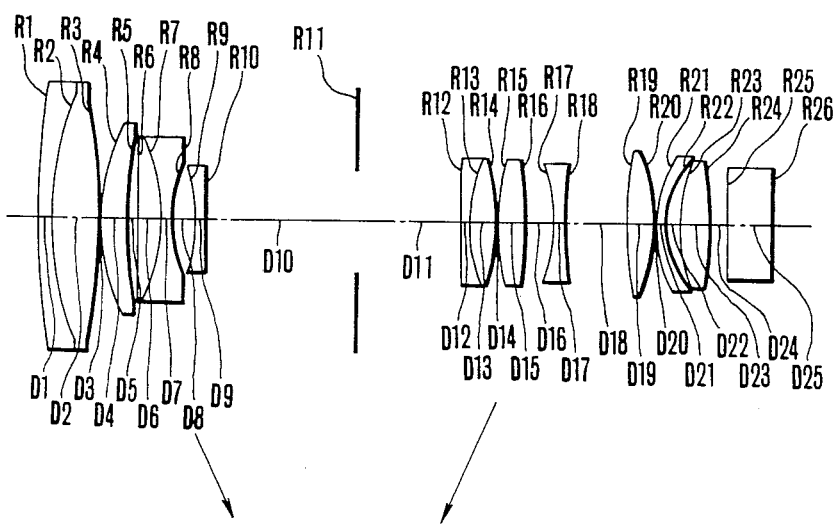
Figure 6:
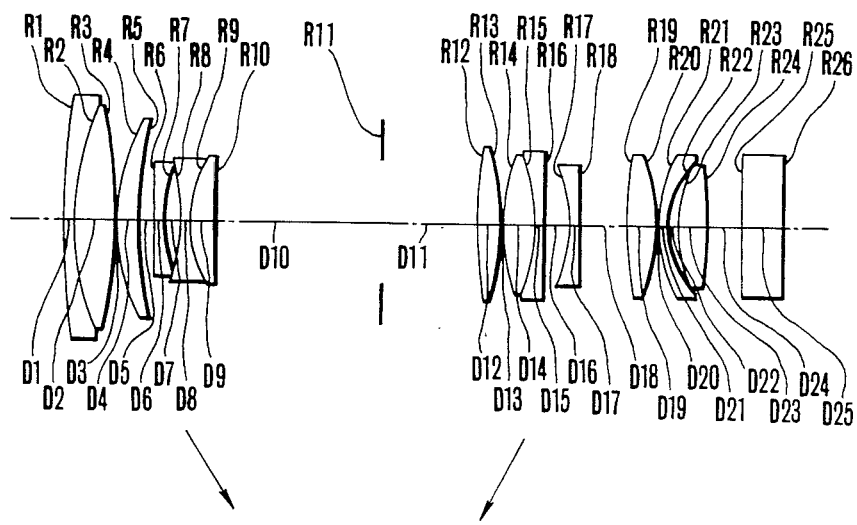
Figure 7:
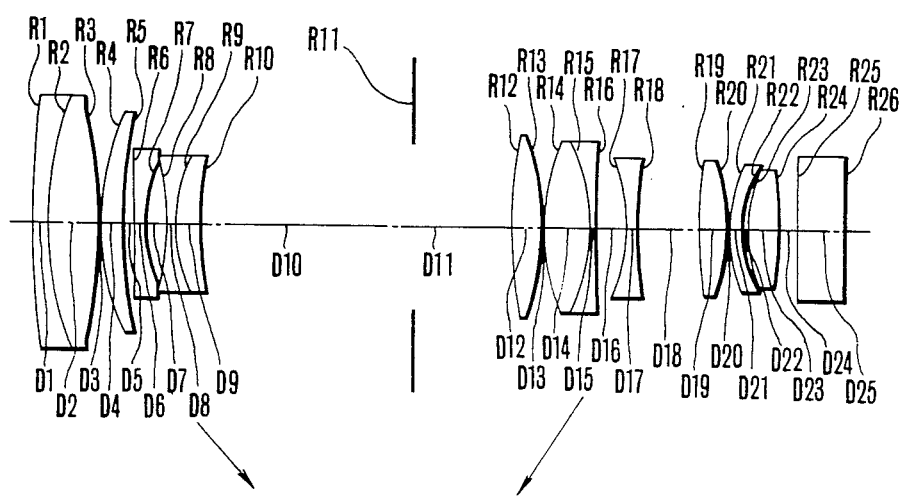
Figure 8:
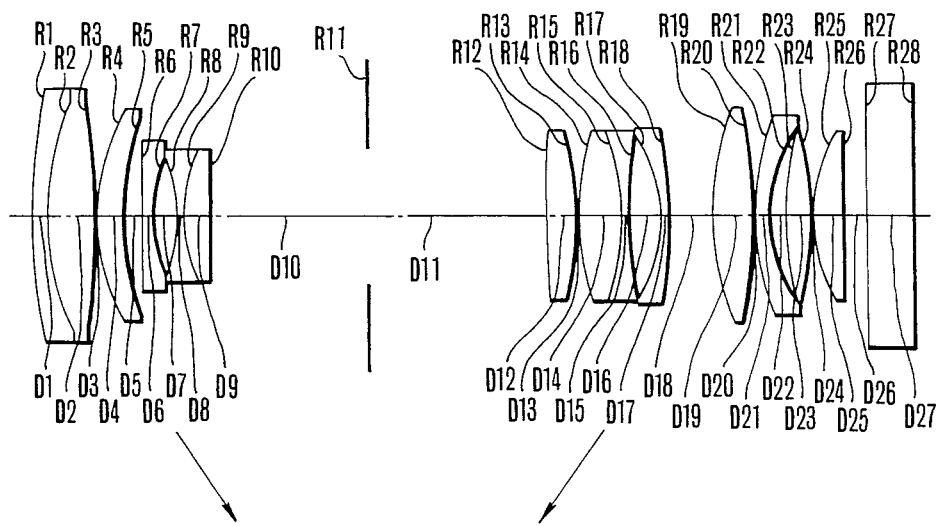
Figure 9:
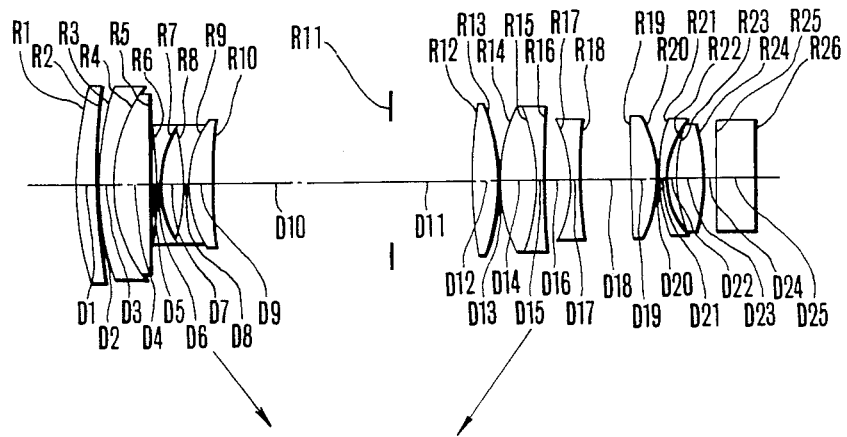
Figure 10A:
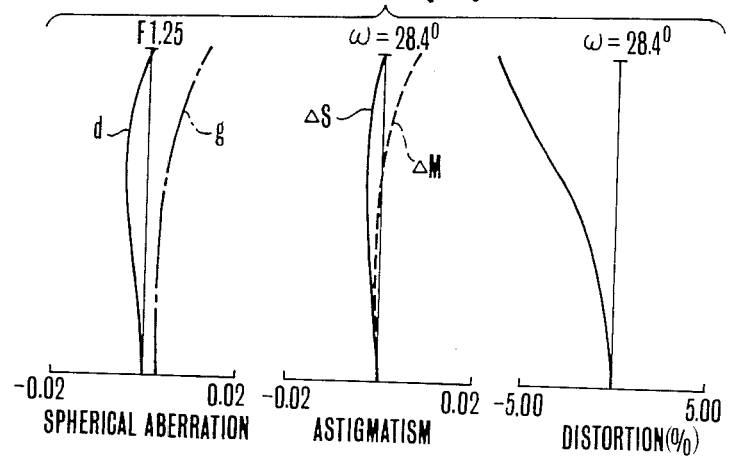
Figure 10B:
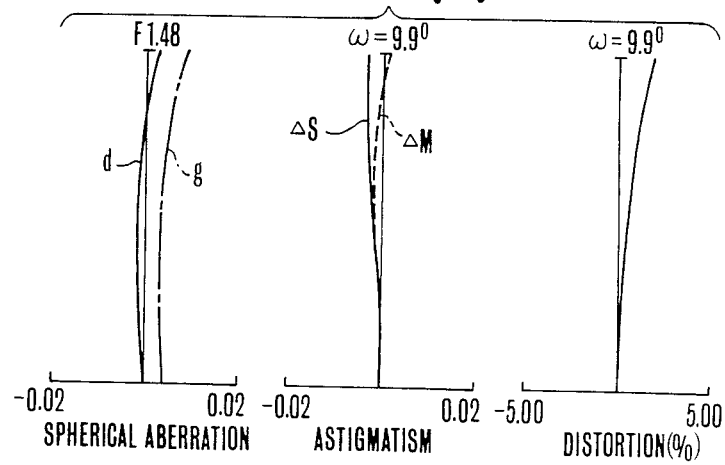
Figure 10C:
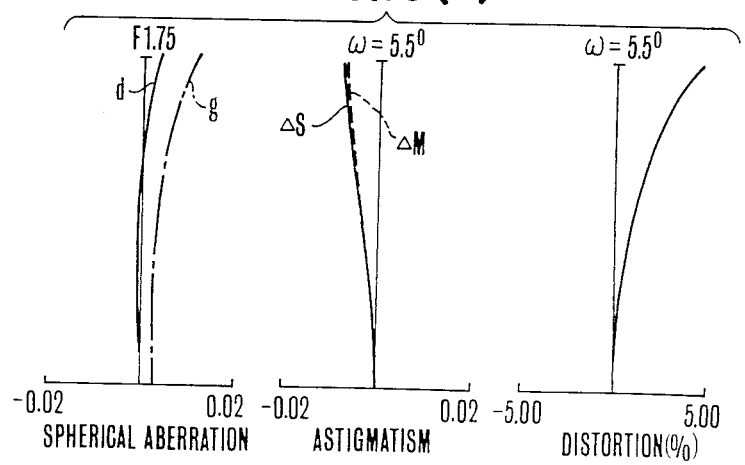
Figure 11A:
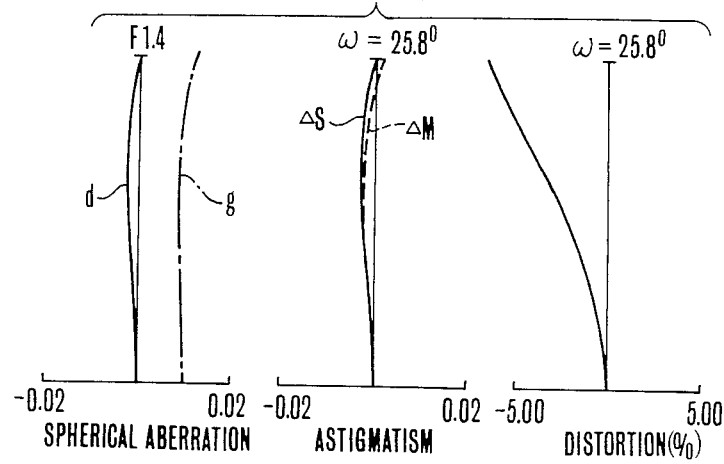
Figure 11B:
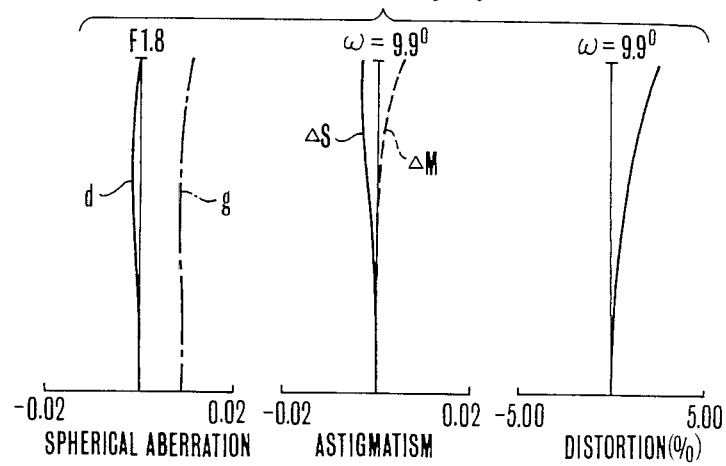
Figure 11C:
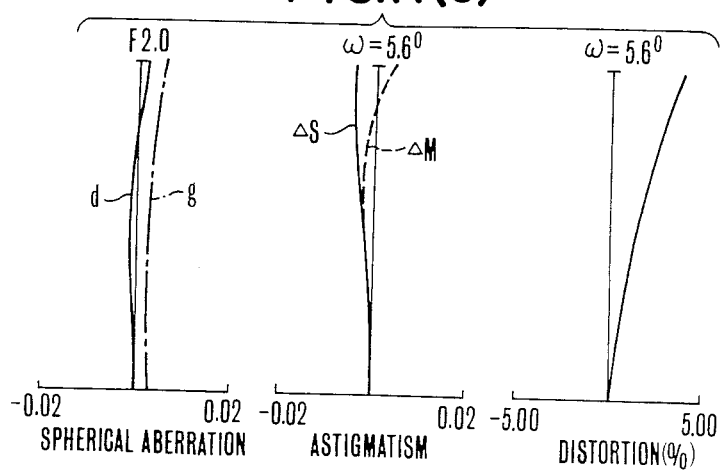
Figure 13A:
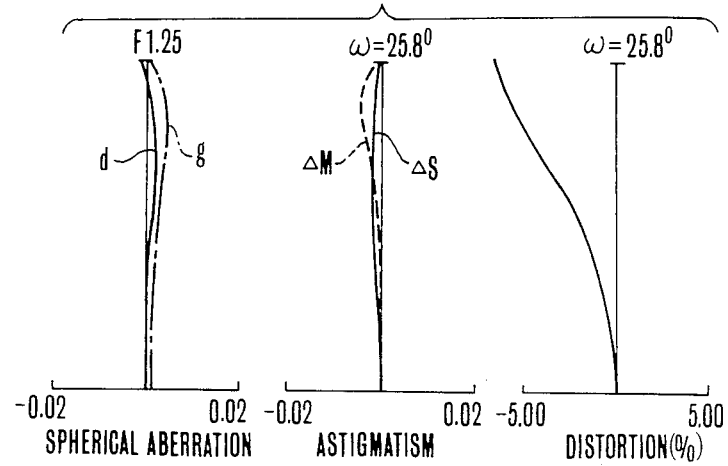
Figure 13B:
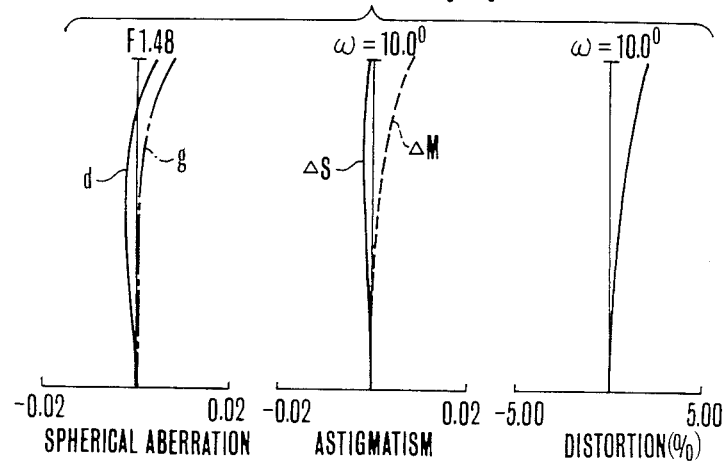
Figure 13C:
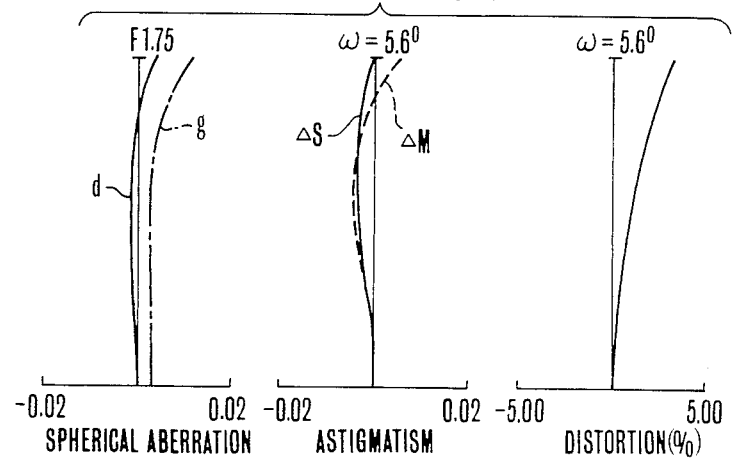
Figure 14A:
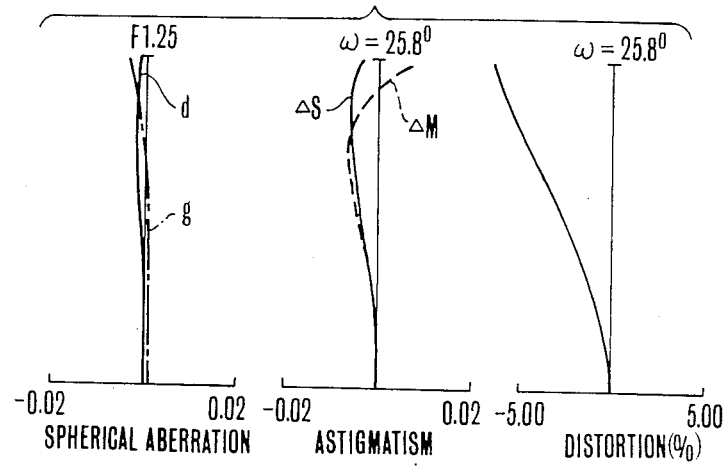
Figure 14B:
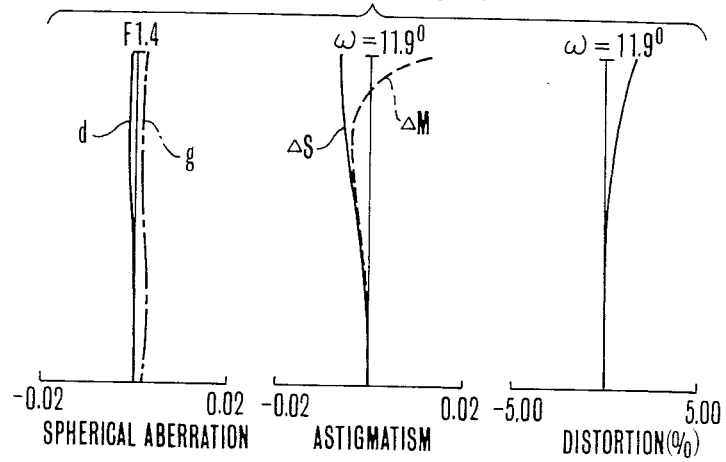
Figure 14C:
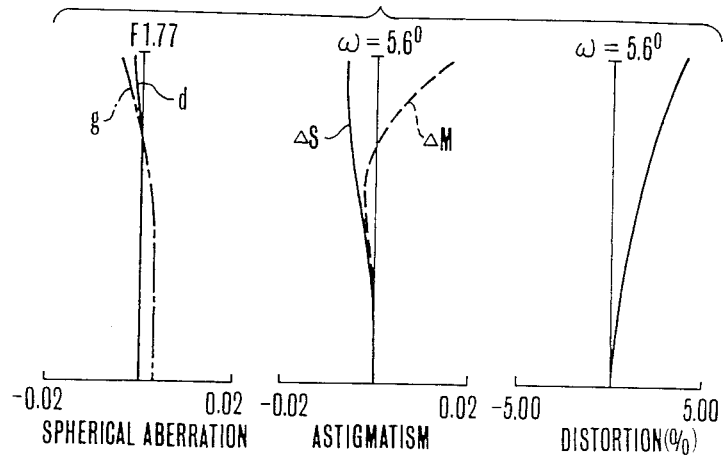
Figure 15A:
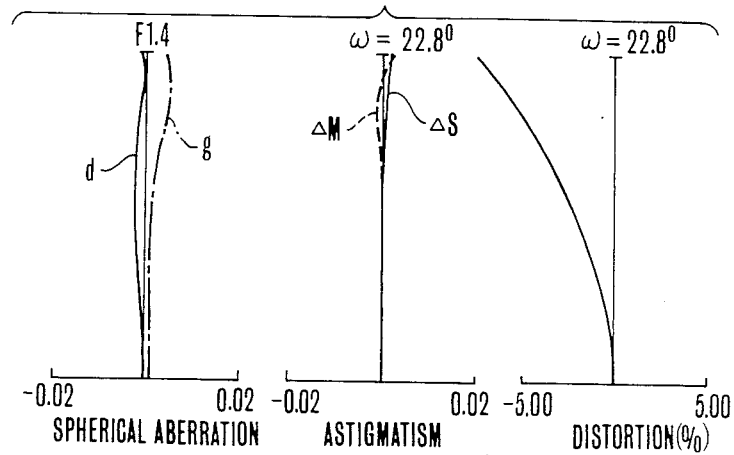
Figure 15B:
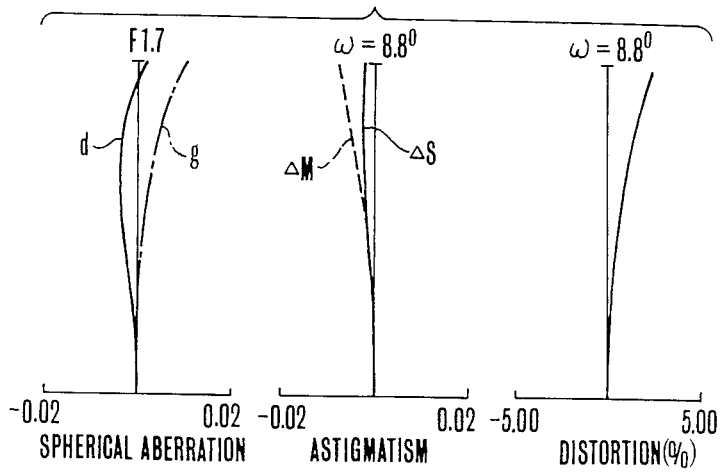
Figure 15C:
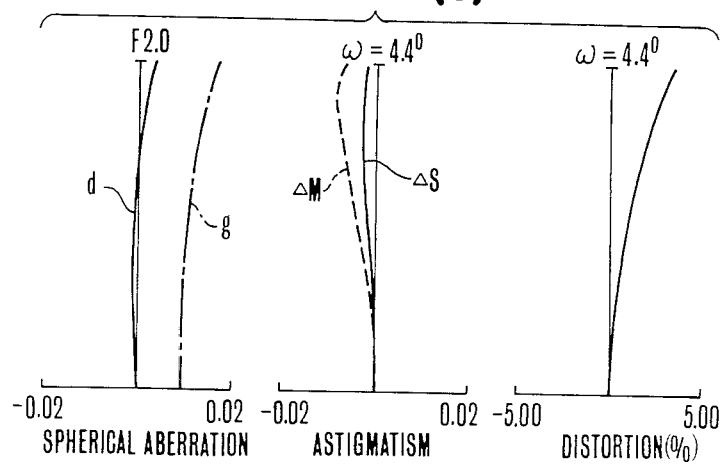
Figure 18:
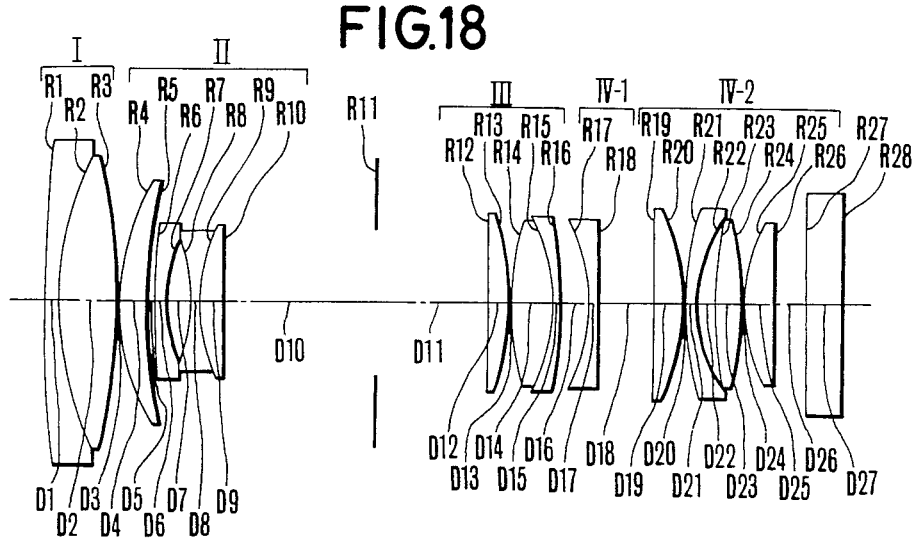
Figure 19:
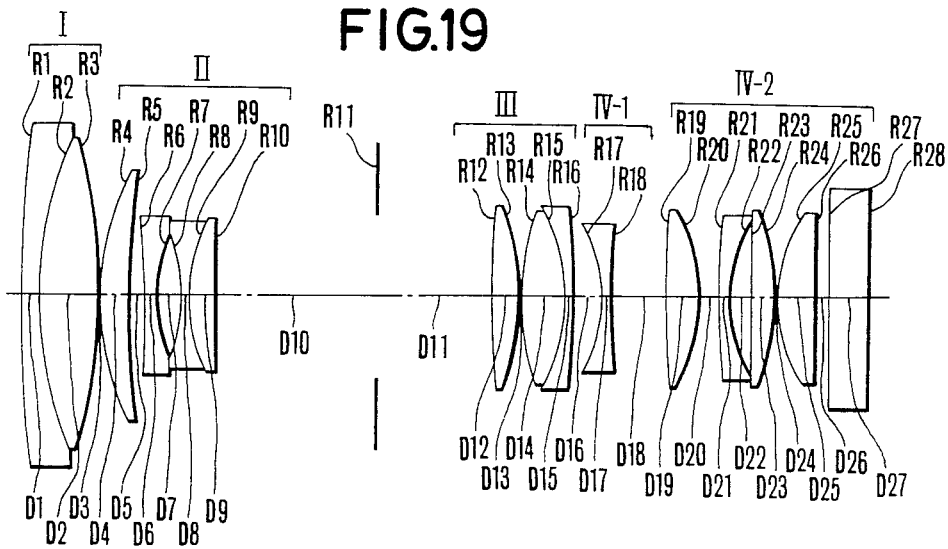
Figure 20:
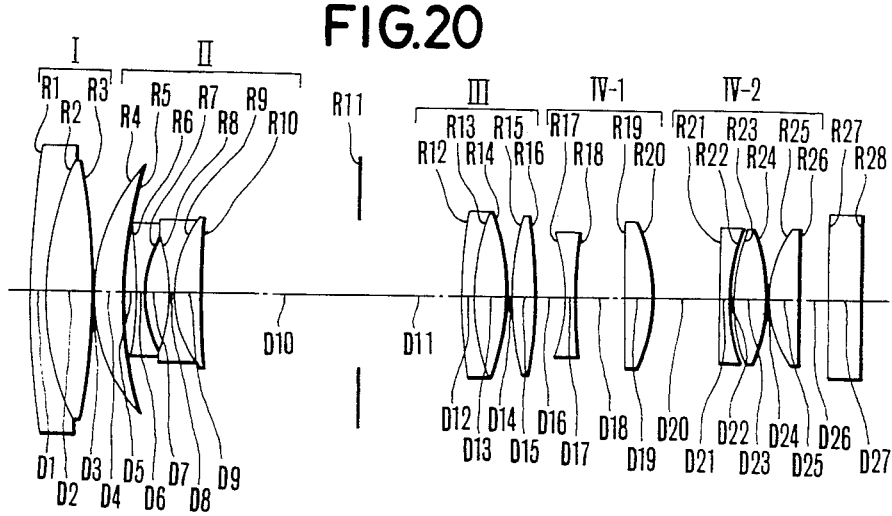
Figure 21:
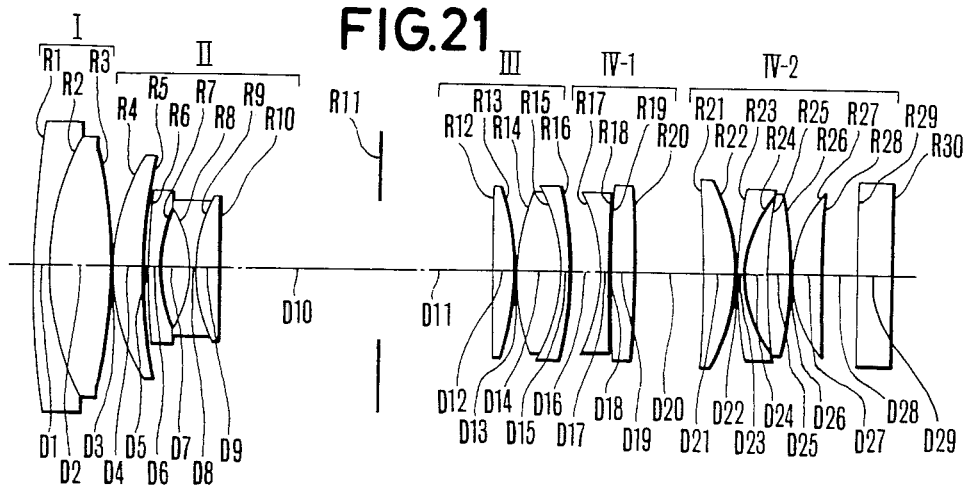
Figure 22A:
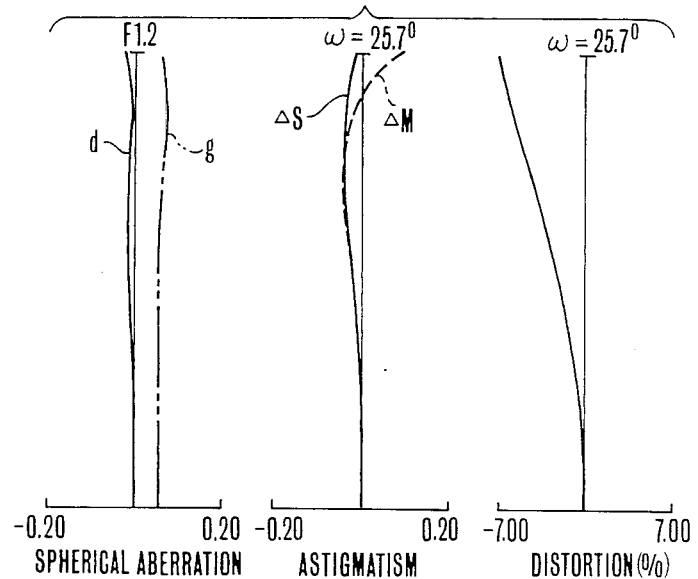
Figure 22B:
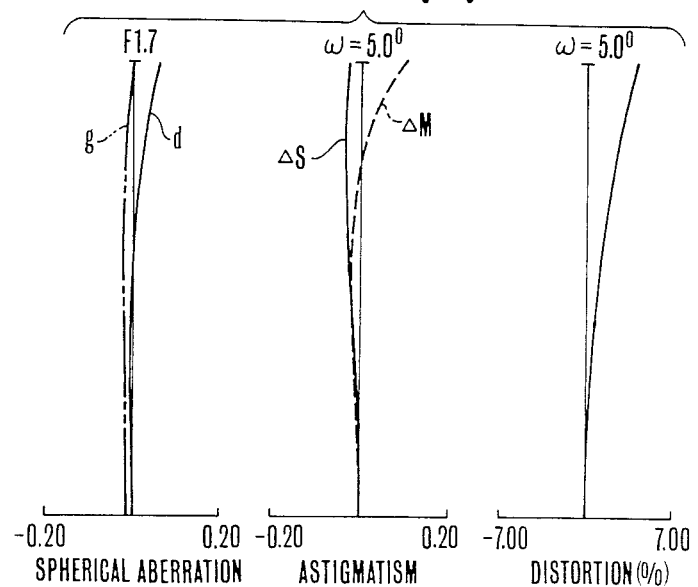
Figure 23A:
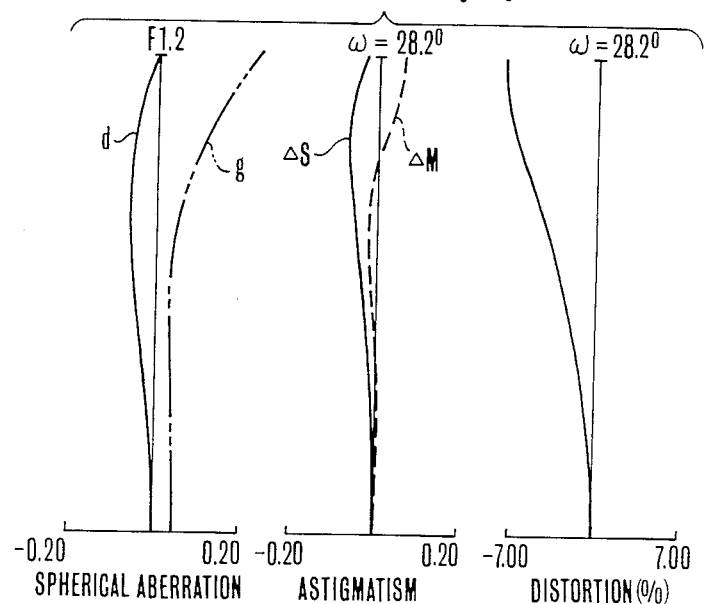
Figure 23B:
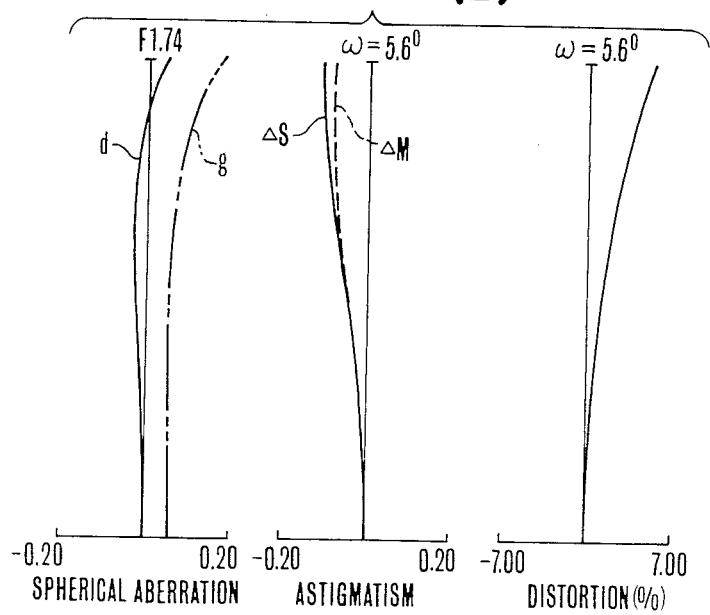
Figure 26A:
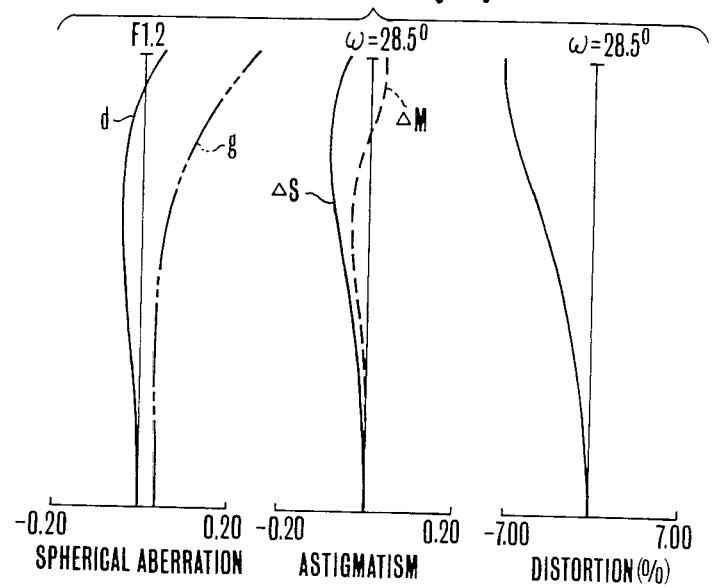
Figure 26B:
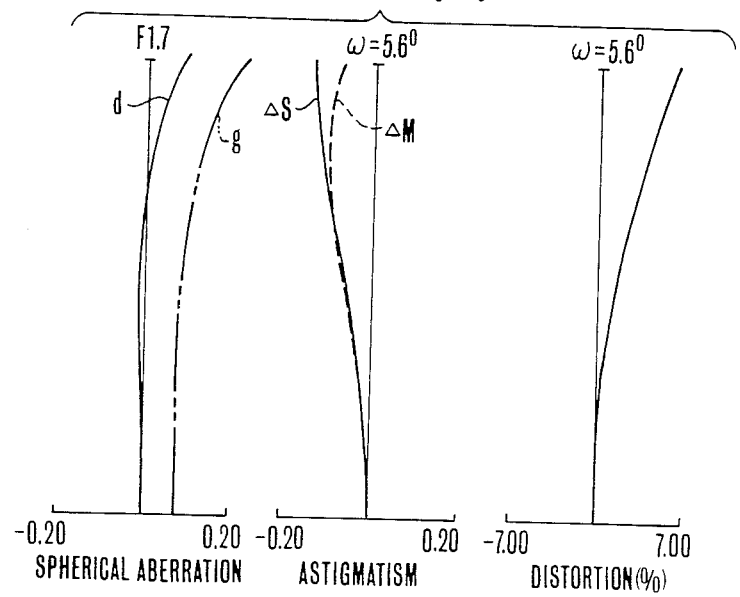
Figure 27:
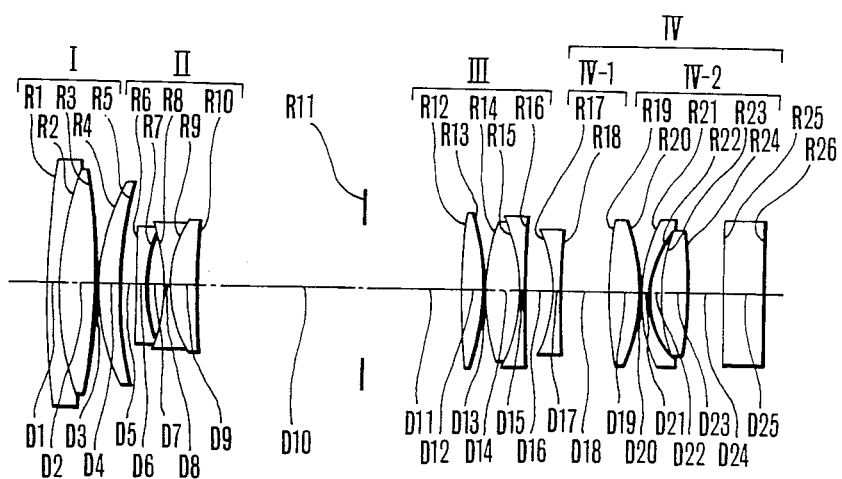
FIGS. 27 to 32 are block diagrams of six examples 12-17 of zoom lenses of the present invention respectively.
Figure 28:
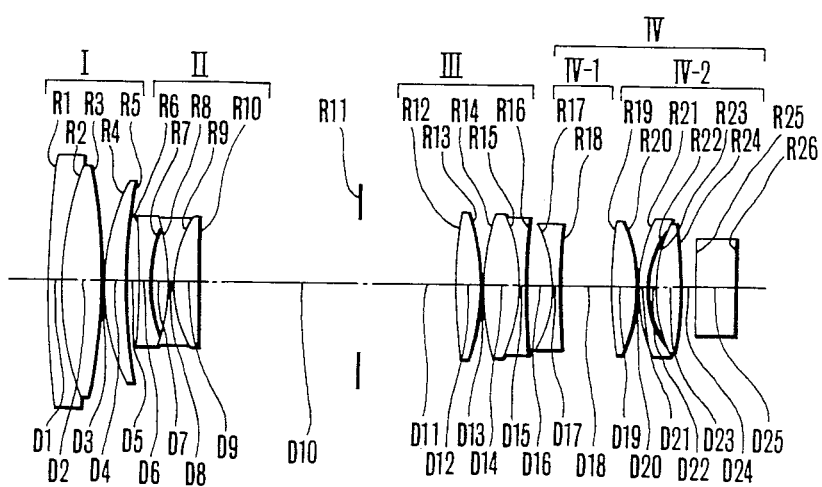
Figure 29:
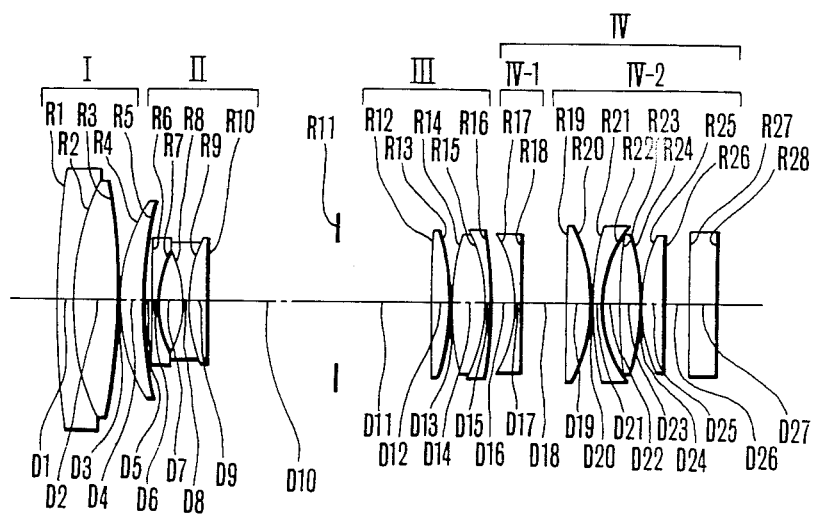
Figure 30:
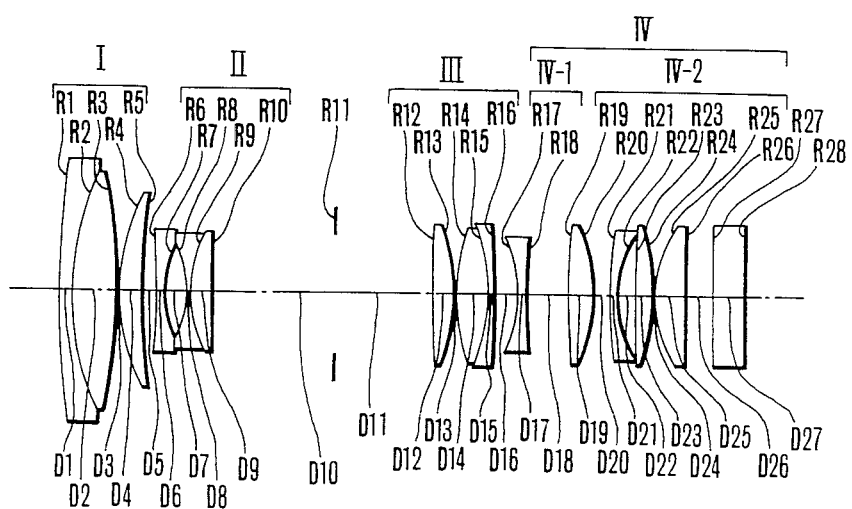
Figure 31:
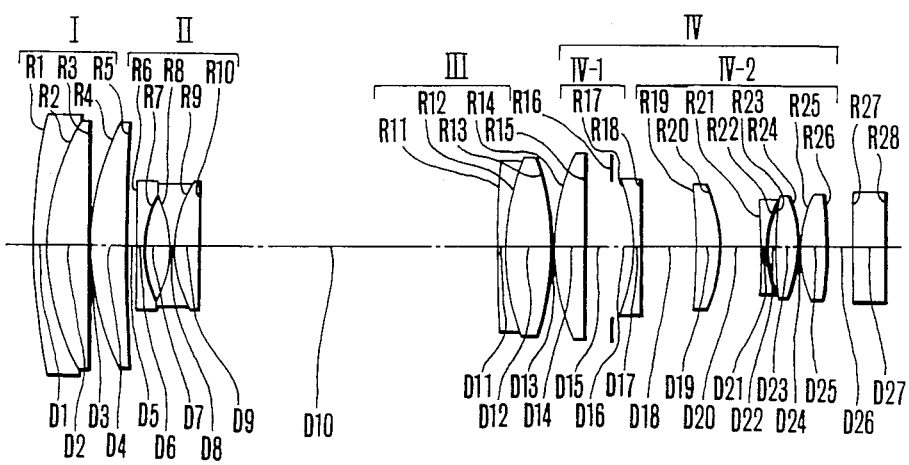
Figure 32:
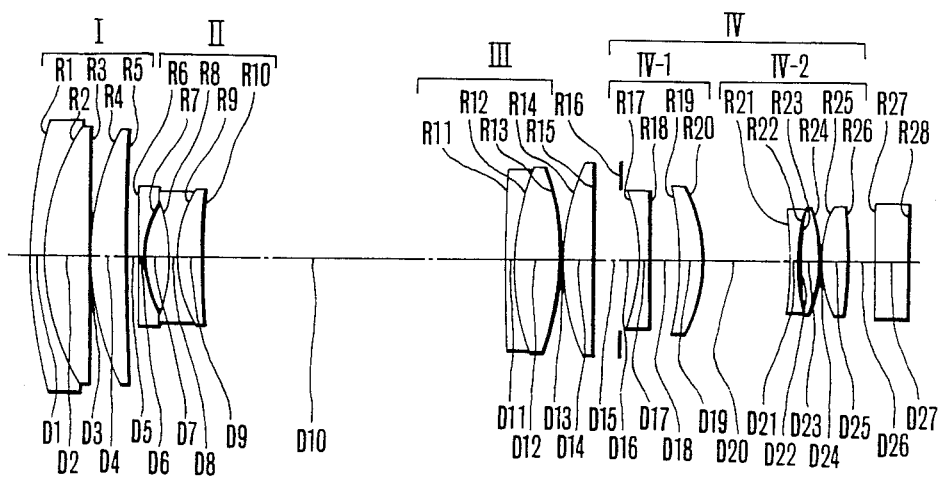
Figure 33A:
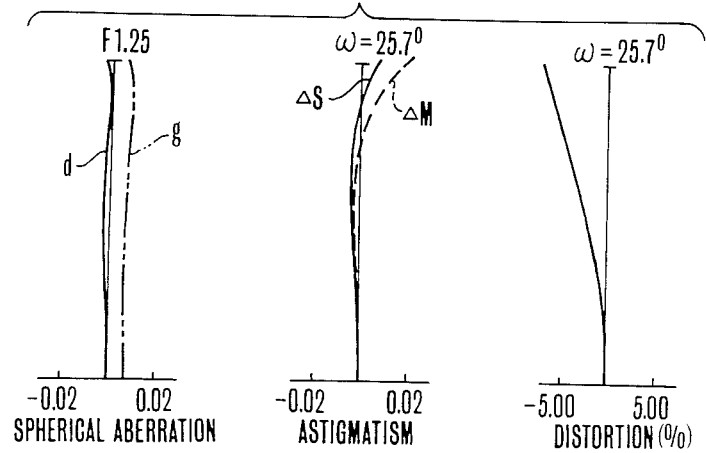
Figure 33B:
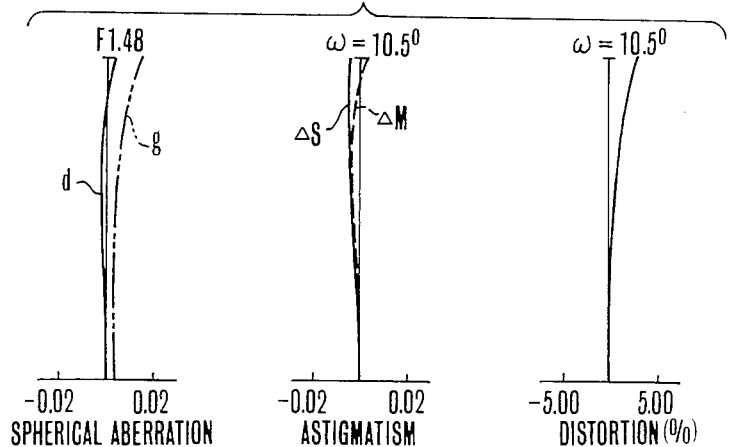
Figure 33C:
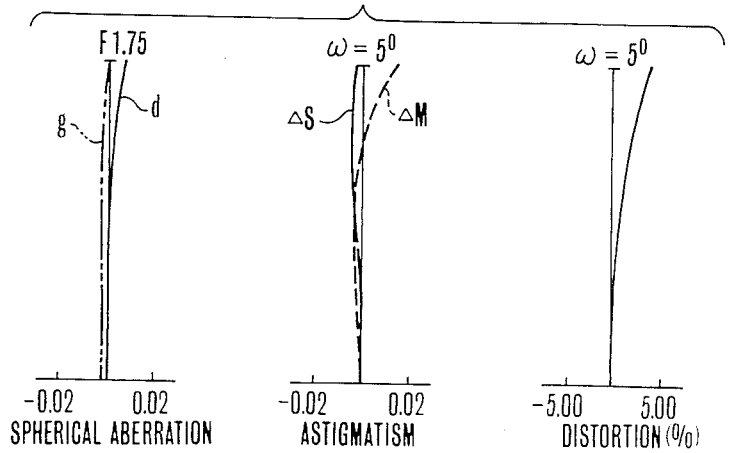
Figure 34A:
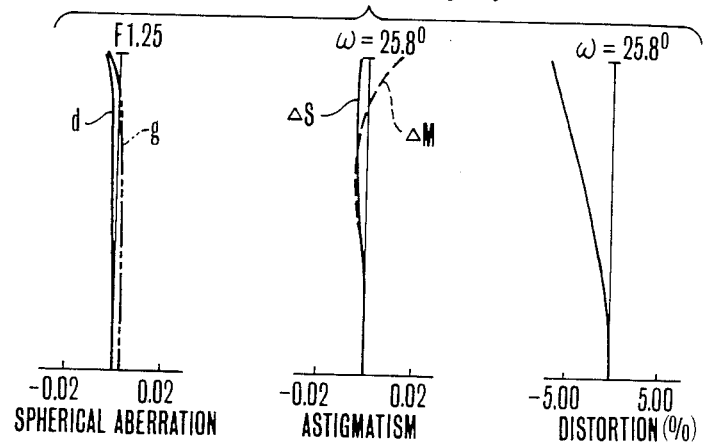
Figure 34B:
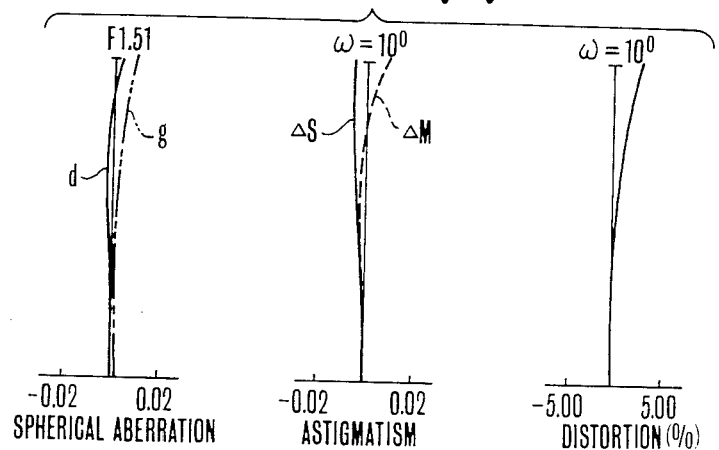
Figure 34C:
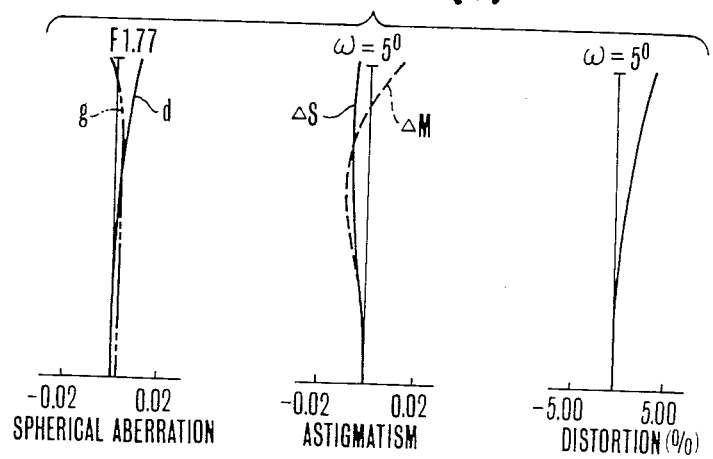
Figure 35A:
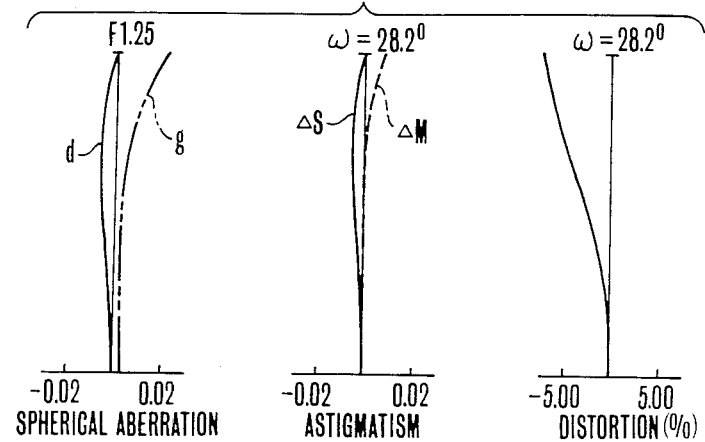
Figure 35B:
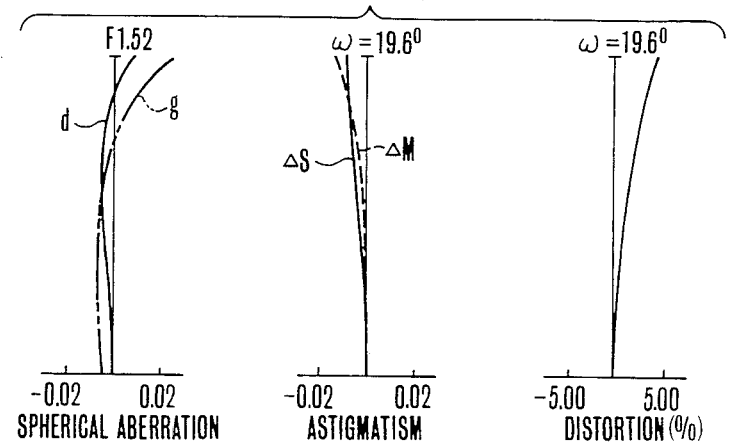
Figure 35C:
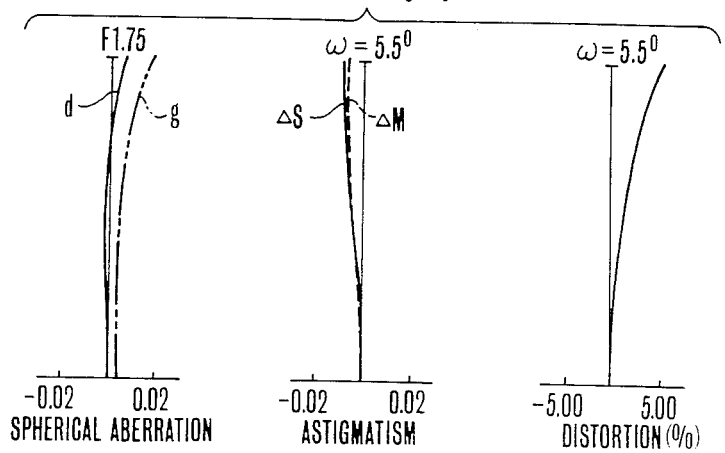
Figure 36A:
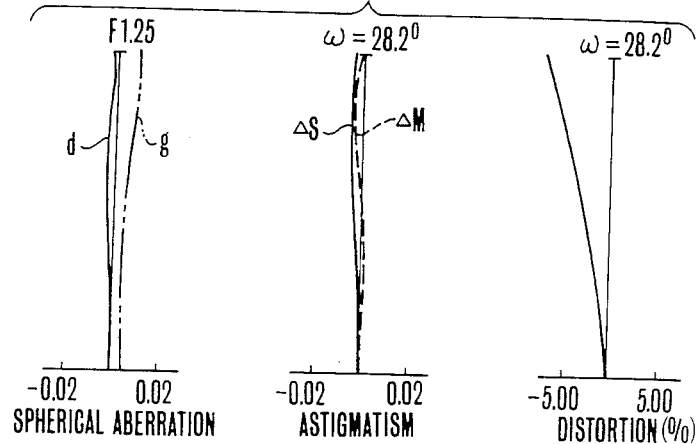
Figure 36B:
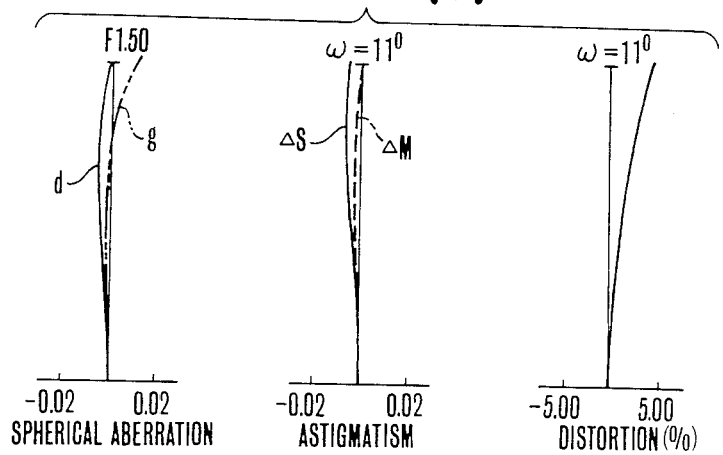
Figure 36C:
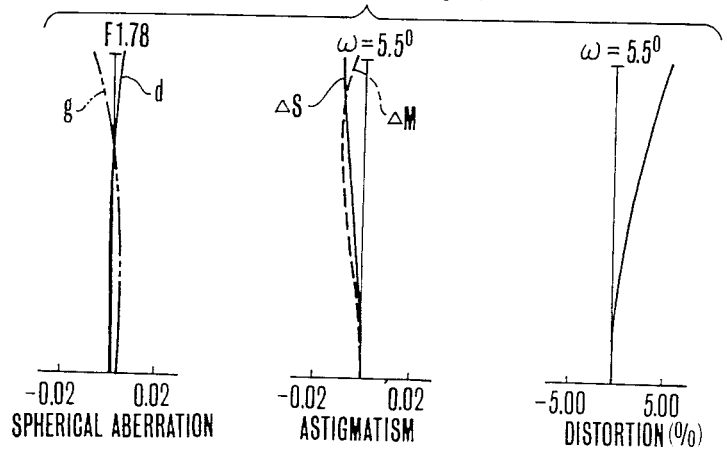
Figure 37A:
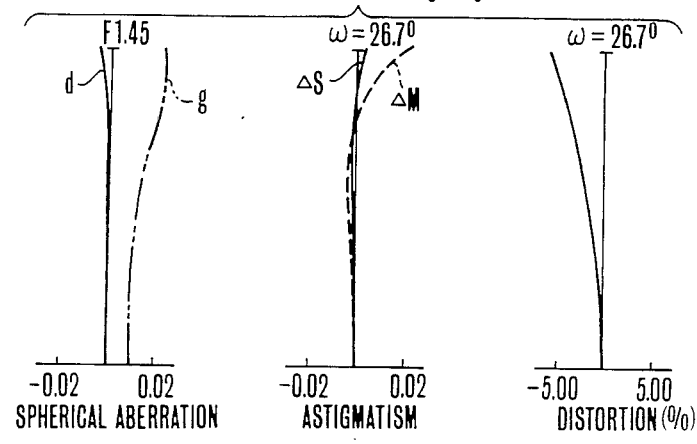
Figure 37B:
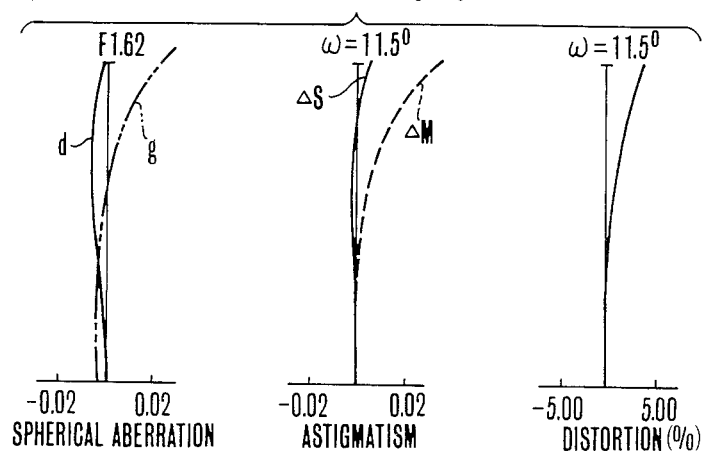
Figure 37C:
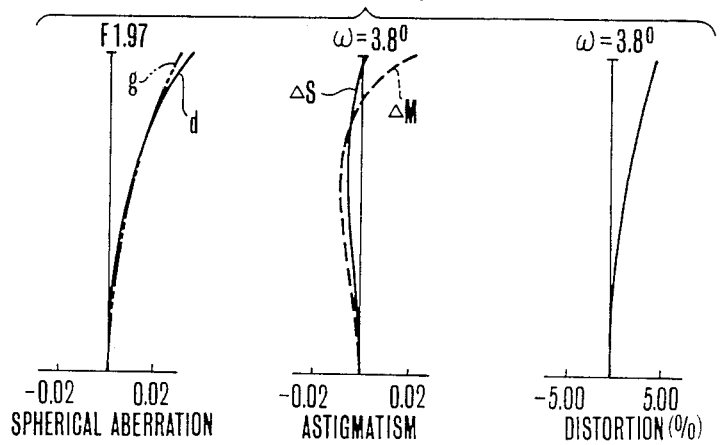

In all the examples shown in FIG. 3 and those that follow, the zoom lens of the invention comprises, from front to rear, a first unit of positive refractive power for focusing, a second unit of negative refractive power which, when zooming, axially moves in a mono-direction throughout, a third unit of positive refractive power which, when zooming, axially moves in the opposite mono-direction to that of movement of the second unit, and a fourth unit of positive refractive power having an image forming function which is held stationary during zooming. One of the features of the invention is that a diaphragm for determining the F-number of the entire system is fixedly positioned between the second and third units at such a location as to satisfy the following condition:

$$0.4 < ls/lw < 0.75 \tag{1}$$

where ls is the axial separation between the second unit and the diaphragm in the wide angle end, and lw is the axial separation between the second and third units in the wide angle end.

Further, another following condition is satisfied:

$$1 < |f_3/f_2| < 2 \tag{2}$$

where $f_2$ and $f_3$ are the focal lengths of the second and third units respectively.

Also, the fourth unit is constructed with two sub-units, or a 4-1st sub-unit of negative refractive power and a 4-2nd sub-unit of positive refractive power.

In application of the invention to a zoom lens in which the zoom section is followed by a fixed section having an image forming function, their arrangement being such that, during zooming, the rays incident on the image forming section are maintained convergent, additional features of the invention are that the aforesaid image forming section comprises, from front to rear, a 4-st lens unit of negative refractive power and a 4-2nd lens unit of positive refractive power, the 4-1st lens unit including at least one negative lens whose front surface is concave toward the front, and the 4-2nd lens unit including at least one negative lens $L_{2N}$ whose rear surface is concave toward the rear, and at least two positive lenses, whereby the following conditions are satisfied:

$$1.74 < |R_{1H}/f_W| < 2.82, R_{1N} < 0 \tag{a}$$

$$1.28 < R_{2N}/f_W < 2.2 \tag{b}$$

$$1.69 < R_{2P}/f_W < 2.6 \tag{c}$$

$$1.65 < d/f_W < 1.42 \tag{d}$$

where $R_{1N}$ is the radius of curvature of the one of the forwardly concave surfaces in the 4-1st lens unit whose curvature is strongest; $R_{2N}$ is the radius of curvature of the one of the rearwardly concave surfaces in the 4-2nd lens unit whose curvature is strongest; $R_{2P}$ is the radius of curvature of the one of the forwardly convex surfaces of the positive lenses on the image side of the negative lens $L_{2N}$ whose curvature is strongest; d is the air separation between the 4-1st and 4-2nd lens units; and $f_W$ is the shortest focal length of the entire system.

The embodiments of the invention are described in detail by reference to the drawings. FIG. 3 shows one of the embodiments of the invention in which each lens unit is depicted as one lens. In the same figure, 31 is a first unit of positive refractive power for focusing; 32 is a second unit of negative refractive power arranged upon zooming from the wide angle to the telephoto end to move monotonously rearwardly; 33 is a third unit of positive refractive power arranged to move monotonously in the opposite or forward direction to that of movement of the second unit; 34 is a fourth unit of positive refractive power having the image forming function which remains stationary during zooming; 35 is a fixed diaphragm whose aperture opening varies in size to change the F-number arranged between the second and third units.

Referring also to FIGS. 16(A) and 16(B), the fourth unit 35 is divided into two parts or a front sub-unit $34_1$ of negative refractive power and a rear sub-unit $34_2$ of positive refractive power spaced apart by a longest distance in the fourth unit.

In the embodiment of the invention, by making one-directionally monotonous the zooming movements of the second and third units on either side of the diaphragm from one end of the entire range to the other, a shortening of the front members of the first unit is achieved, and at the same time a shortening of the total length of the entire system is achieved.

In the popular type of zoom lens, suppose the diaphragm is displaced to between the second and third units. As the third unit takes reciprocating movement convex toward the front when zooming from one end of the entire range to the other, because there is no advantage that the second and third units have a common space, the total length of the entire system is increased. In other words, because, in the type having the reciprocating third unit, the second and third units come nearest to each other at the intermediate zooming position, and because they are prevented from mechanical interference with each other, a surplus space must be created therebetween. By this factor, the total length of the entire system is increased.

In the invention, on the other hand, the feature that the diaphragm is positioned between the second and third units is combined with the feature that the second and third units move in opposite direction from each other from one end of the entire range to the other. Thus, the necessity of the surplus space is obviated. And, not only the second unit has the image magnification varying effect, but also the third unit, too, is allowed to get an image magnification varying effect, thereby giving another advantage that the prescribed zoom ratio can be obtained efficiently, as will be seen from the numerical embodiments to be described later where a great increase of the zoom ratio to as high as about 6 is achieved. Also, the feature that a reduced space is enough of the zooming of the second and third units is combined with a feature that the total zooming movement of the second and third units is lessened, whereby a further shortening of the total length of the entire system is achieved.

Figure 1:
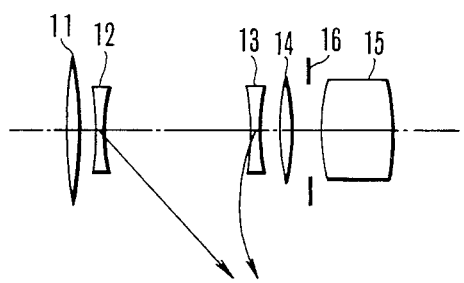
FIGS. 1 and 2 are schematic sectional views of two conventional examples of zoom lens.
Figure 2:
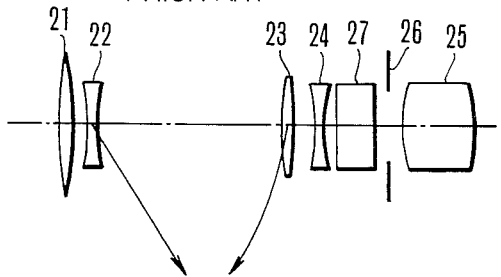

Another disadvantage of the conventional zoom lenses is that in most cases the first unit accounts for 50 to 80% of the weight of the entire system. The effective method for reducing the weight of the zoom lens is, therefore, to choose glass of lower specific gravity for employment in the first unit, or to reduce the volume of the first unit by decreasing its diameter. Of these, the former leads to a lesser degree of freedom of the optical design. To achieve reduction of the weight of the zoom lens while preserving high grade of imagery, therefore, it is advantageous to rely on the latter. On assumption that the thickness of the lens varies in proportion to its diameter, then, as the volume of the lens is proportional to the cube of its diameter, if the diameter can be reduced, for example, 10%, it becomes possible to reduce the weight by as much as 27% for the volume decreases to $(0.9)^3$. For this reason, in the invention, particularly the first unit is given priority of shortening the diameter, when attempt to reduce the weight of the entire system is made. For this purpose, whilst in the prior art shown in FIG. 1 or 2, the diaphragm lies behind the fourth unit, in the invention the diaphragm is brought to as near a position to the first unit as possible, taking its place between the second and third units at almost the center of the longitudinal length of the entire system. Another feature is that the diaphragm and the lens units are so arranged that the diameter of the first unit which is determined by the oblique pencil in the wide angle end and that diameter of the first unit which is determined by the axial pencil in the telephoto end both contribute to a minimum of the effective diameter.

To achieve an increase in the angular field in such a manner that the longitudinal and lateral lengths of the entire lens system fall in a good balance, for the flexibility of design of the effective diameter of the first unit is increased, the effective diameter of the first unit is prevented from increasing with increase in the angle of oblique pencil in the wide angle end, and is made partly determined by the diameter of the axial light bundle in the telephoto end at the regulated value of F-number for the telephone end.

The requirements of achieving a great increase of the zoom ratio and of facilitating a shortening of the entire system in the longitudinal and lateral directions are fulfilled without having the second and third lens units to mechanically interfere with the diaphragm, when the inequalities of condition (1) are satisfied.

Though, as has been described above, the positioning of the diaphragm nearer the first unit than before is advantageous to shorten the diameter of the first unit, the diameter of those behind the diaphragm, for example, the fourth unit, is caused to increase. The inequalities of condition (1) represent achievement of the reduction of the size of the entire system while preserving good balance between the effective diameters of the first lens and those that follow. When the lower limit of the inequalities of condition (1) is exceeded, the diameter of the second to fourth lens units is caused to increase, although the diameter of the first unit decreases. Moreover, particularly the problem that, as the third unit moves relative to the diaphragm, the height of incidence of the oblique pencil on the fourth unit varies to a large extent with an increase in the fluctuation of aberrations becomes very serious, because the difficulty of correcting such aberrations increases. When the distance from the diaphragm to the first unit increases beyond the upper limit, the diameter of the first unit increases. With this, when to achieve an increase of the angular field, the rate of growth of that diameter is increased objectionably.

The compact zoom lens of the invention can be realized by setting forth the foregoing features. Yet, in order to maintain the aberrations stable throughout the entire zooming range with the limitation of the bulk and size of the entire system to the minimum, it is preferred to further satisfy the following condition:

$$0.5 < |E/X| < 1.3 \qquad (3)$$

where X and E are respectively the total zooming movements of the second and third units. When the total zooming movement of the third unit is decreased beyond the lower limit of the inequalities of condition (3), the refractive power of the second unit for the prescribed zoom ratio can be weakened with advantages on the manufacture and the aberration correction, but the movement of the second unit is increased. Therefore, even if the diaphragm is positioned as near the second unit as possible, the resultant increase in the distance between the first unit and the diaphragm calls for an objectionably large increase in the diameter of the first unit. Conversely when the movement of the third unit is increased beyond the upper limit of the inequalities of condition (3), the movement of the second unit can be relatively reduced with decrease of the diameter of the first unit, but, because the image magnification varying effect of the second unit is lowered with increase in the difficulty of obtaining the prescribed zoom ratio.

In the case of the type of zoom lens used in the invention, because the rays travelling from the second to the third unit are diverging, the height of incidence of the axial rays on the third unit is higher than that of incidence of the second unit. If the difference between these heights of incidence is large, good stability of aberrations, particularly spherical aberration, becomes difficult to maintain. On this account, in the invention, the refractive powers of the second and third units are related to each other by the inequalities of condition (2). When this condition is satisfied, the aberrations are maintained stable throughout the extended zooming range. In more detail, with the use of the type in which the second and third units move in opposite direction to each other throughout the zooming range, when to achieve the great increase in the zoom ratio, it is recommended as proposed in, for example, Japanese Patent Publication No. SHO 51-12424, that the image magnifications of the second and third unit change across a point of $-1$ times simultaneously during zooming. From the interval, e, between the principal planes of the second and third units at this point, one has $$af_3 = -2f_2 + e$$

The principal planes of the second and third units take their places usually within their own units. According to the prior art of Japanese Patent Publication No. SHO 51-12424, the ratio of the movement of the second unit from the wide angle end to a position at which unity of image magnification occurs to the total zooming movement thereof, that is, the relative distance of the switching point, $a$, measured from the wide angle end, lies $$0.5 < a < 0.95$$

To meet this condition, it is preferable to set forth at least $e > 0$, and, from the point of view of avoiding the mechanical interference between the second and third units, the principal plane interval, e, takes as large a value as possible. Because the increase in the principal plane interval, e, calls for an increase in the total length of the entire system, it cannot, however, be too much greatly enlarged.

Also, in application of the zoom lens to some fields of photography, it is not always necessary that the range of switching points α is as such. For example, taking a low-magnification zoom lens, the limits for the switching point α may be increased up to $0.95 < \alpha < 1.2$. Nevertheless, the prescribed zoom ratio can be obtained, and, moreover, the shortening of the total length of the zoom lens can be attained.

According to the invention, therefore, on assumption that $0.5 < \alpha < 1.2$, and that the interval between the principal planes of the second and third units is so chosen as to avoid mechanical interference therebetween, the ratio of the powers of the second and third units is found to lie in the following range:

$$0.95 < |f_3/f_2| < 2$$

When this condition is, however, violated, since, as $|f_3/f_2| < 1$, the third unit gets too strong a power, because the height at which the diverging rays from the second unit are incident on the third unit is much increased, the range of variation with zooming of the aberrations is increased objectionably.

Conversely when $|f_3/f_2| > 2$, the refractive power of the third unit becomes so weak that the total zooming movement is increased to obtain the prescribed zoom ratio. As a result, the difference between the heights of incidence of the axial pencil on the third unit in the wide angle and telephoto ends becomes too large. Therefore, the resultant aberrations are difficult to correct well. Hence, it is preferred to set forth the inequalities of condition (2) for the second and third units in order to achieve a great increase in the range while still permitting good stability of aberration correction throughout the extended range.

The present invention has an additional feature that the fourth unit having the image forming function stationary during zooming is so formed with positive overall power that the limits for the zooming range are properly adjusted, whereby the fourth unit is divided into a front or 4-1st sub-unit of negative power and a rear or 4-2nd sub-unit of positive power to facilitate assurance of the prescribed back-focal distance and good correction of the image aberrations over the entire area of the picture format, when the relative aperture is increased to as high as 1.2 in F-number.

In more detail, the first to third units constitute a partial system of positive refractive power. Since this partial system is small-sized in the lateral direction, because the emerging rays from the partial system are convergent, it is necessary that the arriving rays at the fourth unit are made once nearly or exactly afocal by the diverging function of the 4-1st sub-unit of negative refractive power, before they are focused to an image at the prescribed back-focal distance by the 4-2nd sub-unit of positive refractive power.

The 4-1st sub-unit is also used for correcting the residual under-corrected spherical aberration of the partial system, and the 4-2nd sub-unit is also used for correcting the coma and sagittal halo over the entire area of the picture format. Further, the negative curvature of field ascribable to the positive refractive powers of the third unit and the 4-2nd sub-unit is compensated for the 4-1st sub-unit of negative refractive power.

When the above-stated features or conditions are satisfied, improved results for the compact zoom lens of the invention can be attained. Yet, it is preferred to further set forth a range for the focal lengths $f_{4\text{-}1}$ and $f_{4\text{-}2}$ of the 4-1st and 4-2nd sub-units as follows:

$$1.3 < |f_{4\text{-}1}/f_{4\text{-}2}| < 8.0 \qquad (4)$$

The inequalities of condition (4) enable the various aberrations over the entire area of the picture format to be corrected in good balance, while preserving the prescribed back focal distance. When the power of the 4-1st sub-unit is stronger than the lower limit of the inequalities of condition (4), though the back focal distance becomes sufficiently long, over-correction of spherical aberration results, and the curvature of field is increased to the positive direction. Furthermore, the effective diameter of the 4-2nd sub-unit must be increased with increase of the size of the lens system. Conversely when the power of the 4-1st sub-unit is weaker than the upper limit, the back focal distance becomes too short. Also, under-correction of spherical aberration results and the curvature of field is increased in negative sense when in the wide angle positions.

To achieve a further improvements of the aberration, the 4-1st sub-unit is made include at least a negative lens whose front surface is concave toward the front, whereby the spherical aberration produced from the zoom section can be well corrected over the entire range of visible wavelengths. The 4-2nd sub-unit also is made include at least one negative lens $L_{2N}$ whose rear surface is of strong concave curvature toward the rear, whereby the coma produced from the zoom section and the 4-1st sub-unit can be well corrected. Further concerning the 4-2nd sub-unit, in order that, while the amount of aberrations it produces being minimized, its refractive power is made positive as a whole, if the number of positive lenses in it is only one, the duty of each lens surface for bearing the power becomes too heavy. So, the 4-2nd sub-unit is made include at least two positive lenses. After all, despite the relative aperture being greatly increased, it is possible to well correct the various aberrations over the entire area of the picture format.

The specific zoom lenses of FIGS. 27 to 32 each comprise, from front to rear, a first lens unit I for focusing which is held stationary during zooming, a second lens unit II for zooming which moves rearward as zooming from the wide angle to the telephoto end, a third lens unit III which moves to compensate for the image shift resulting from the variation of the image magnification, and an image forming section IV which constitutes part of the features of the invention, being held stationary during zooming. The image forming section IV comprises, front to rear, a 4-1st sub-unit IV-1 of negative refractive power and a 4-2nd sub-unit IV-2 of positive refractive power spaced apart from each other by the longest distance in the image forming section.

In this embodiment, the lens units I, II and III are so constructed and arranged that the rays emerging from the zoom section of the second and third lens units II and III are always convergent to the image forming section throughout the entire zooming range.

And, in this embodiment, the image forming section IV is constructed with the 4-1st sub-unit of negative refractive power and the 4-2nd sub-unit of positive refractive power, so that the convergent rays from the zoom section are first made almost afocal by the 4-1st sub-unit and then focused to an image on a photosensitive surface while maintaining the prescribed back focal distance. Thereby, in the case of the video cameras, the low pass filter, infrared cut filter, and other necessarry optical members can occupy the space between the rear vertex of the zoom lens and the image pickup device. In the case of the photographic cameras, the quick return mirror box can be positioned in that space.

And, further, by the 4-1st sub-unit of negative refractive power, the on-axis aberrations mainly produced from the zoom section are corrected. By the 4-2nd sub-unit of positive refractive power the off-axis aberrations such as coma and sagittal halo are mainly corrected. With this, a great increase of the relative aperture to 1.25 in F-number is achieved. That is, in this embodiment, the 4-1st sub-unit is made to include at least a negative lens facing the concave surface toward the front. By this negative lens, the spherical aberration produced from the zoom section is corrected over the entire wavelength region. Also the 4-2nd sub-unit is made to include at least one negative lens $L_{2N}$ facing the strong concave surface toward the rear, thereby the coma produced from the negative lens of the 4-1st sub-unit and the zoom section is corrected.

Further, the 4-2nd lens sub-unit is made to include at least two positive lenses. Otherwise, because there is only one positive lens, the duty of each surface for refractive power would be very heavy in order that the amount of various aberrations produced is lessened, and the overall refractive power is made positive. Thus, a zoom lens of reduced total length and increased relative aperture with the various aberrations well corrected over the entire area of the picture format is achieved with as few a total number of lens elements as possible.

And, further, each lens is constructed so as to satisfy the conditions (a) to (d), whereby the various aberrations produced from the zoom section are well corrected for high optical performance.

The inequalities of condition (a) enable the back focal distance to be maintained at the prescribed value and the spherical aberration produced from the zoom section to be properly corrected while preserving the negative refractive power of the 4-1st sub-unit. When the upper limit is exceeded, under-correction of spherical aberration results. When the lower limit is exceeded, over-correction results.

The inequalities of condition (b) enable the total length of the lens to be shortened while minimizing the amounts of field curvature and coma, particularly outward coma. When the upper limit is exceeded, under-correction of curvature of field results, and the total length of the lens is increased. Conversely when the lower limit is exceeded, the amount of outward coma produced is increased, which is difficult to correct well.

The inequalities of condition (c) enable the outward coma and halo aberration of the sagittal light beam produced from the negative lens $L_{2N}$ of the 4-2nd sub-unit to be corrected well. When the upper limit is exceeded, the outward coma and sagittal halo produced from the negative lens $L_{2N}$ become difficult to correct well. When the lower limit is exceeded, the amount of inward coma produced is increased.

The inequalities of condition (d) enable the separation between the 4-1st sub-unit and 4-2nd sub-unit to be properly maintained, and the aberrations, mainly the off-axis aberrations to be corrected in good balance over the entire area of the picture frame while achieving the shortening of the entire system. When the upper limit is exceeded, the total length of the lens becomes too long, and the diameter of the 4-2nd lens unit also increases, being an obstacle for small-sizing the entire lens system. Also, when the lower limit is exceeded, astigmatism, coma and other off-axis aberrations become difficult to correct.

The zoom lenses shown in FIGS. 27 to 30 have the diaphragm between the second lens unit II and the third lens unit III. The zoom lenses shown in FIGS. 31 and 32 have the diaphragm between the third lens unit III and the fourth lens unit IV. And, when zooming, while the second lens unit II and the third lens unit III do not interfere with each other, and, particularly when the diaphragm is arranged between the second lens unit II and third lens unit III, also with the diaphragm, the second lens unit II moves rearward, and the third lens unit III moves either monotonously forward, or reciprocably. In this embodiment, the zoom section of such zoom type is combined with the above-described image forming section when, while the prescribed zoom ratio is efficiently obtained, the diameter of the lens unit I is shortened, and the total length of the lens is shortened.

The zoom type in which the two lens units on either side of the diaphragm unit are moved to effect zooming as in the embodiment of the invention, if the operating mechanism is constructed by using the conventional cylinder cam, the diameter of the outer barrel of the lens mounting is increased. For this reason, in this embodiment, it is preferred that the operating mechanism is constructed in such a manner that the cam sleeve is arranged either ahead or behind the diaphragm unit, or that the plate cam is arranged on one side of the diaphragm unit. Also, in the bar type in which the movable lens is guided for linear movement by a bar, it is a disadvantage that this bar is merely positioned outside the diaphragm unit from the standpoint of the increase of the diameter of the outer barrel. To avoid this, instead of the round iris diaphragm, a slide type of diaphragm unit in which, for example, two blades are slidingly moved to the left or right, may be used so that spaces above and below the diaphragm unit are formed to pass the respective bars therethrough, with an advantage that the structure of the operating mechanism is simplified and the diameter of the outer barrel of the lens mounting is shortened.

Examples of specific zoom lenses of the invention can be constructed in accordance with the numerical data given in the following tables for the radii of curfature, R, the axial thicknesses or air separations, D, and the refractive indices, N, and Abbe numbers, $\nu$, of the glasses of the lens elements with the subscripts numbered consecutively from front to rear. I, II, III, IV denote respectively the first, the second, the third and the fourth units, $f_1$, $f_2$, $f_3$ and $f_4$ are the focal lengths of the first, second, third and fourth lens units respectively.

| Numerical Example 1 | | | |
|---|---|---|---|
| F = 1.00–5.52 | FNO = 1:1.25–1.75 | 2ω = 57.0°–11.0° | |
| R1 = 16.3271 | D1 = 0.2153 | N1 = 1.80518 | ν1 = 25.4 |
| R2 = 4.1903 | D2 = 0.8419 | N2 = 1.60311 | ν2 = 60.7 |

-continued

| | | Numerical Example 1 | | |
|---|---|---|---|---|
| I | R3 = -8.2045 | D3 = 0.0144 | | |
| | R4 = 2.9687 | D4 = 0.3636 | N3 = 1.62299 | ν3 = 58.2 |
| | R5 = 6.3151 | D5 = Variable | | |
| II | R6 = 19.4638 | D6 = 0.1052 | N4 = 1.6968 | ν4 = 55.5 |
| | R7 = 1.749 | D7 = 0.4114 | | |
| | R8 = -2.1231 | D8 = 0.0957 | N5 = 1.6968 | ν5 = 55.5 |
| | R9 = 2.1236 | D9 = 0.3061 | N6 = 1.84666 | ν6 = 23.9 |
| | R10 = 17.1111 | D10 = Variable | | |
| | R11 = Stop | D11 = Variable | | |
| III | R12 = 111.1357 | D12 = 0.3157 | N7 = 1.7495 | ν7 = 35.3 |
| | R13 = -3.3613 | D13 = 0.0144 | | |
| | R14 = 3.6305 | D14 = 0.5932 | N8 = 1.62299 | ν8 = 58.2 |
| | R15 = -2.3417 | D15 = 0.1129 | N9 = 1.84666 | ν9 = 23.9 |
| | R16 = -5.7841 | D16 = Variable | | |
| IV | R17 = -2.0491 | D17 = 0.1148 | N10 = 1.5927 | ν10 = 35.3 |
| | R18 = -24.8116 | D18 = 0.7845 | | |
| | R19 = -56.2850 | D19 = 0.4401 | N11 = 1.72 | ν11 = 50.2 |
| | R20 = -2.6179 | D20 = 0.0144 | | |
| | R21 = 5.644 | D21 = 0.1244 | N12 = 1.84666 | ν12 = 23.9 |
| | R22 = 1.9298 | D22 = 0.2822 | | |
| | R23 = 7.6877 | D23 = 0.3683 | N13 = 1.64 | ν13 = 60.1 |
| | R24 = -3.9225 | D24 = 0.0144 | | |
| | R25 = 2.3208 | D25 = 0.3779 | N14 = 1.60311 | ν14 = 60.7 |
| | R26 = 19.0217 | D26 = 0.4784 | | |
| | R27 = ∞ | D27 = 0.4724 | N15 = 1.51633 | ν15 = 64.1 |
| | R28 = ∞ | | | |

| F | 1. | 3.1 | 5.52 |
|---|---|---|---|
| D5 | 0.1530 | 1.588 | 2.040 |
| D10 | 2.1992 | 0.7642 | 0.3126 |
| D11 | 1.6231 | 0.8344 | 0.2552 |
| D16 | 0.4302 | 1.2189 | 1.7981 | f1 = 5.236
f2 = -1.392
f3 = 2.27
f4 = 2.665

| | | Numerical Example 2 | | |
|---|---|---|---|---|
| | F = 1.00-5.52 | FNO = 1:1.40-2.00 | 2ω = 51.6°-10.0° | |
| I | R1 = 12.1932 | D1 = 0.2173 | N1 = 1.80518 | ν1 = 25.4 |
| | R2 = 5.4181 | D2 = 0.6941 | N2 = 1.60311 | ν2 = 60.7 |
| | R3 = -11.5323 | D3 = 0.0181 | | |
| | R4 = 3.2998 | D4 = 0.3561 | N3 = 1.62299 | ν3 = 58.2 |
| | R5 = 6.3479 | D5 = Variable | | |
| II | R6 = -36.2586 | D6 = 0.3803 | N4 = 1.84666 | ν4 = 23.9 |
| | R7 = -2.5477 | D7 = 0.1086 | N5 = 1.69680 | ν5 = 55.5 |
| | R8 = 1.9960 | D8 = 0.4241 | | |
| | R9 = -2.0773 | D9 = 0.1207 | N6 = 1.77256 | ν6 = 49.6 |
| | R10 = -19.7915 | D10 = Variable | | |
| | R11 = Stop | D11 = Variable | | |
| III | R12 = 208.1219 | D12 = 0.1207 | N7 = 1.84666 | ν7 = 23.9 |
| | R13 = 2.5604 | D13 = 0.4225 | N8 = 1.69680 | ν8 = 55.5 |
| | R14 = -3.4792 | D14 = 0.0181 | | |
| | R15 = 4.0314 | D15 = 0.4467 | N9 = 1.77250 | ν9 = 49.6 |
| | R16 = -7.6102 | D16 = Variable | | |
| IV | R17 = -2.0944 | D17 = 0.1207 | N10 = 1.51633 | ν10 = 64.1 |
| | R18 = 12.3126 | D18 = 0.9457 | | |
| | R19 = 6.6933 | D19 = 0.4225 | N11 = 1.65844 | ν11 = 50.9 |
| | R20 = -3.1399 | D20 = 0.0181 | | |
| | R21 = 2.1461 | D21 = 0.1207 | N12 = 1.84666 | ν12 = 23.9 |
| | R22 = 1.4045 | D22 = 0.2258 | | |
| | R23 = 2.4569 | D23 = 0.4587 | N13 = 1.69680 | ν13 = 55.5 |
| | R24 = -7.9511 | D24 = 0.2414 | | |
| | R25 = ∞ | D25 = 0.6640 | N14 = 1.51633 | ν14 = 64.1 |
| | R26 = ∞ | | | |

| F | 1. | 3.11 | 5.52 |
|---|---|---|---|
| D5 | 0.1127 | 1.6217 | 2.092 |
| D10 | 2.2738 | 0.7648 | 0.2945 |
| D11 | 1.6135 | 0.8188 | 0.2411 |
| D16 | 0.4587 | 1.2534 | 1.8311 | f1 = 5.726
f2 = -1.449
f3 = 2.294
f4 = 2.856

Numerical Example 3

F = 1.00–5.52  FNO = 1:1.40–1.75  2ω = 51.5°–10.0°

| | | | | |
|---|---|---|---|---|
| I | R1 = 15.1717 | D1 = 0.1928 | N1 = 1.80518 | ν1 = 25.4 |
| | R2 = 5.0971 | D2 = 0.6506 | N2 = 1.60311 | ν2 = 60.7 |
| | R3 = −10.0692 | D3 = 0.0181 | | |
| | R4 = 3.2671 | D4 = 0.3614 | N3 = 1.62299 | ν3 = 58.2 |
| | R5 = 6.3240 | D5 = Variable | | |
| II | R6 = −14.6297 | D6 = 0.1205 | N4 = 1.7725 | ν4 = 49.6 |
| | R7 = 1.9562 | D7 = 0.3460 | | |
| | R8 = −3.0111 | D8 = 0.1205 | N5 = 1.69680 | ν5 = 55.5 |
| | R9 = 2.0179 | D9 = 0.4217 | N6 = 1.84666 | ν6 = 23.9 |
| | R10 = 104.2199 | D10 = Variable | | |
| | R11 = Stop | D11 = Variable | | |
| III | R12 = 11.7622 | D12 = 0.3855 | N7 = 1.71300 | ν7 = 53.8 |
| | R13 = −3.9049 | D13 = 0.0181 | | |
| | R14 = 3.8392 | D14 = 0.5542 | N8 = 1.69680 | ν8 = 55.5 |
| | R15 = −2.9425 | D15 = 0.1205 | N9 = 1.84666 | ν9 = 23.9 |
| | R16 = −47.3102 | D16 = Variable | | |
| IV | R17 = −2.2482 | D17 = 0.1205 | N10 = 1.60311 | ν10 = 60.7 |
| | R18 = 36.2018 | D18 = 0.8447 | | |
| | R19 = 6.7139 | D19 = 0.5181 | N11 = 1.69680 | ν11 = 55.5 |
| | R20 = −3.3161 | D20 = 0.0181 | | |
| | R21 = 2.5036 | D21 = 0.1205 | N12 = 1.84666 | ν12 = 23.9 |
| | R22 = 1.4558 | D22 = 0.1743 | | |
| | R23 = 2.3658 | D23 = 0.5181 | N13 = 1.77250 | ν13 = 49.6 |
| | R24 = −11.5514 | D24 = 0.6024 | | |
| | R25 = ∞ | D25 = 0.6627 | N14 = 1.51633 | ν14 = 64.1 |
| | R26 = ∞ | | | |

| F | 1. | 2.59 | 5.52 |
|---|---|---|---|
| D5 | 0.2560 | 1.7018 | 2.4156 |
| D10 | 2.7509 | 1.3051 | 0.5914 |
| D11 | 1.6594 | 0.9502 | 0.1374 |
| D16 | 0.4578 | 1.1671 | 1.9798 | f1 = 5.895
f2 = −1.566
f3 = 2.560
f4 = 3.025

Numerical Example 4

F = 1.00–5.52  FNO = 1:1.25–1.75  2ω = 51.6°–10.0°

| | | | | |
|---|---|---|---|---|
| I | R1 = 15.2954 | D1 = 0.2173 | N1 = 1.80518 | ν1 = 25.4 |
| | R2 = 5.0694 | D2 = 0.6941 | N2 = 1.51633 | ν2 = 64.1 |
| | R3 = −9.9980 | D3 = 0.0181 | | |
| | R4 = 3.1081 | D4 = 0.3561 | N3 = 1.63854 | ν3 = 55.4 |
| | R5 = 7.8559 | D5 = Variable | | |
| II | R6 = −11.2545 | D6 = 0.1207 | N4 = 1.78590 | ν4 = 44.2 |
| | R7 = 1.8052 | D7 = 0.3458 | | |
| | R8 = −3.2227 | D8 = 0.1086 | N5 = 1.60311 | ν5 = 60.7 |
| | R9 = 1.9118 | D9 = 0.3803 | N6 = 1.84666 | ν6 = 23.9 |
| | R10 = 9.5983 | D10 = Variable | | |
| | R11 = Stop | D11 = Variable | | |
| III | R12 = 8.0065 | D12 = 0.4467 | N7 = 1.65844 | ν7 = 50.9 |
| | R13 = −3.2508 | D13 = 0.0181 | | |
| | R14 = 3.3195 | D14 = 0.6157 | N8 = 1.65844 | ν8 = 50.9 |
| | R15 = −2.6560 | D15 = 0.1207 | N9 = 1.84666 | ν9 = 23.9 |
| | R16 = −81.1255 | D16 = Variable | | |
| IV | R17 = −1.9997 | D17 = 0.1207 | N10 = 1.51633 | ν10 = 64.1 |
| | R18 = 11.5917 | D18 = 0.9102 | | |
| | R19 = 8.9981 | D19 = 0.4225 | N11 = 1.65844 | ν11 = 50.9 |
| | R20 = −2.6952 | D20 = 0.0181 | | |
| | R21 = 2.5713 | D21 = 0.1207 | N12 = 1.84666 | ν12 = 23.9 |
| | R22 = 1.3604 | D22 = 0.1418 | | |
| | R23 = 2.2585 | D23 = 0.4587 | N13 = 1.69680 | ν13 = 55.5 |
| | R24 = −7.1526 | D24 = 0.2414 | | |
| | R25 = ∞ | D25 = 0.6640 | N14 = 1.51633 | ν14 = 64.1 |
| | R26 = ∞ | | | |

| F | 1. | 2.73 | 5.52 |
|---|---|---|---|
| D5 | 0.1609 | 1.6699 | 2.3304 |

-continued

| Numerical Example 4 | | | |
|---|---|---|---|
| D10 | 3.0545 | 1.5455 | 0.8850 |
| D11 | 1.4262 | 0.7754 | 0.1155 |
| D16 | 0.4587 | 1.1096 | 1.7695 |

$$f1 = 5.702$$
$$f2 = -1.449$$
$$f3 = 2.354$$
$$f4 = 3.433$$

| Numerical Example 5 | | | |
|---|---|---|---|
| F = 1.00–5.52  FNO = 1:1.25–1.75  2ω = 51.6°–10.0° | | | |

|   |   | R1 = 9.4632 | D1 = 0.2173 | N1 = 1.80518 | ν1 = 25.4 |
|---|---|---|---|---|---|
|   |   | R2 = 3.9788 | D2 = 0.6941 | N2 = 1.60311 | ν2 = 60.7 |
| I |   | R3 = −11.0830 | D3 = 0.0181 |   |   |
|   |   | R4 = 3.0476 | D4 = 0.3863 | N3 = 1.69680 | ν3 = 55.5 |
|   |   | R5 = 4.4949 | D5 = Variable |   |   |
|   |   | R6 = −101.0634 | D6 = 0.1207 | N4 = 1.77250 | ν4 = 49.6 |
|   |   | R7 = 1.9551 | D7 = 0.3564 |   |   |
| II |   | R8 = −2.8723 | D8 = 0.1207 | N5 = 1.69700 | ν5 = 48.5 |
|   |   | R9 = 2.1208 | D9 = 0.3803 | N6 = 1.84666 | ν6 = 23.9 |
|   |   | R10 = −25.1832 | D10 = Variable |   |   |
|   |   | R11 = Stop | D11 = Variable |   |   |
|   |   | R12 = 23.1783 | D12 = 0.4467 | N7 = 1.7725 | ν7 = 49.6 |
|   |   | R13 = −4.0743 | D13 = 0.0181 |   |   |
| III |   | R14 = 3.6035 | D14 = 0.6157 | N8 = 1.69700 | ν8 = 48.5 |
|   |   | R15 = −3.6749 | D15 = 0.1207 | N9 = 1.84666 | ν9 = 23.9 |
| C |   | R16 = 9.6393 | D16 = Variable |   |   |
|   |   | R17 = −2.0868 | D17 = 0.1207 | N10 = 1.69680 | ν10 = 55.5 |
|   |   | R18 = −7.0810 | D18 = 0.6045 |   |   |
|   |   | R19 = 3.6021 | D19 = 0.6036 | N11 = 1.80610 | ν11 = 40.9 |
|   |   | R20 = −8.6183 | D20 = 0.0181 |   |   |
| IV |   | R21 = 3.6281 | D21 = 0.1207 | N12 = 1.84666 | ν12 = 23.9 |
|   |   | R22 = 1.7616 | D22 = 0.3234 |   |   |
|   |   | R23 = 6.6746 | D23 = 0.3863 | N13 = 1.56384 | ν13 = 60.7 |
|   |   | R24 = −3.7392 | D24 = 0.0181 |   |   |
|   |   | R25 = 2.4395 | D25 = 0.4225 | N14 = 1.60311 | ν14 = 60.7 |
|   |   | R26 = −132.8169 | D26 = 0.3622 |   |   |
|   |   | R27 = ∞ | D27 = 0.6640 | N15 = 1.51633 | ν15 = 64.1 |
|   |   | R28 = ∞ |   |   |   |

| F | 1. | 2.28 | 5.52 |
|---|---|---|---|
| D5 | 0.1332 | 1.3404 | 2.1372 |
| D10 | 2.2157 | 1.0085 | 0.2117 |
| D11 | 2.6044 | 1.7049 | 0.3175 |
| D16 | 0.4587 | 1.3582 | 2.7457 |

$$f1 = 5.867$$
$$f2 = -1.811$$
$$f3 = 3.259$$
$$f4 = 2.293$$

| Numerical Example 6 | | | |
|---|---|---|---|
| F = 1.00–5.52  FNO = 1:1.40–2.00  2ω = 45.6°–8.8° | | | |

|   |   | R1 = 5.4504 | D1 = 0.2895 | N1 = 1.77250 | ν1 = 49.6 |
|---|---|---|---|---|---|
|   |   | R2 = 10.8059 | D2 = 0.0158 |   |   |
| I |   | R3 = 4.8950 | D3 = 0.1895 | N2 = 1.80518 | ν2 = 25.4 |
|   |   | R4 = 2.2143 | D4 = 0.5263 | N3 = 1.77250 | ν3 = 49.6 |
|   |   | R5 = 26.9677 | D5 = Variable |   |   |
|   |   | R6 = −7.8906 | D6 = 0.1053 | N4 = 1.78590 | ν4 = 44.2 |
|   |   | R7 = 1.6429 | D7 = 0.2794 |   |   |
| II |   | R8 = −2.8976 | D8 = 0.0947 | N5 = 1.60311 | ν5 = 60.7 |
|   |   | R9 = 1.6441 | D9 = 0.3316 | N6 = 1.84666 | ν6 = 23.9 |
|   |   | R10 = 7.6211 | D10 = Variable |   |   |
|   |   | R11 = Stop | D11 = Variable |   |   |
|   |   | R12 = 8.4797 | D12 = 0.3895 | N7 = 1.65844 | ν7 = 50.9 |
|   |   | R13 = −2.8606 | D13 = 0.0158 |   |   |
| III |   | R14 = 2.6423 | D14 = 0.5368 | N8 = 1.65844 | ν8 = 50.9 |
|   |   | R15 = −2.5323 | D15 = 0.1053 | N9 = 1.84666 | ν9 = 23.9 |
|   |   | R16 = 1449.2905 | D16 = Variable |   |   |
|   |   | R17 = −1.9317 | D17 = 0.1053 | N10 = 1.51633 | ν10 = 64.1 |
|   |   | R18 = 9.4622 | D18 = 0.7647 |   |   |
|   |   | R19 = 63.0253 | D19 = 0.3684 | N11 = 1.65844 | ν11 = 50.9 |
| IV |   | R20 = −2.2605 | D20 = 0.0158 |   |   |
|   |   | R21 = 2.3409 | D21 = 0.1053 | N12 = 1.84666 | ν12 = 23.9 |

-continued

Numerical Example 6

| | | | |
|---|---|---|---|
| R22 = 1.2711 | D22 = 0.1499 | | |
| R23 = 2.4216 | D23 = 0.4000 | N13 = 1.69680 | ν13 = 55.5 |
| R24 = −5.2788 | D24 = 0.2105 | | |
| R25 = ∞ | D25 = 0.5789 | N14 = 1.51633 | ν14 = 64.1 |
| R26 = ∞ | | | |

| F | 1. | 2.73 | 5.52 |
|---|---|---|---|
| D5 | 0.1181 | 1.4339 | 2.010 |
| D10 | 2.6191 | 1.3033 | 0.7273 |
| D11 | 1.2408 | 0.6733 | 0.0979 |
| D16 | 0.40 | 0.9675 | 1.5429 |

$f1 = 5.182$
$f2 = -1.263$
$f3 = 2.053$
$f4 = 3.886$

Numerical Example 7

F = 8.30–45.84  FNO = 1:1.2–1.7  2ω = 51.5°–10.0°

| | | | | |
|---|---|---|---|---|
| I | R1 = 126.02 | D1 = 1.6 | N1 = 1.80518 | ν1 = 25.4 |
| | R2 = 41.71 | D2 = 5.5 | N2 = 1.60311 | ν2 = 60.7 |
| | R3 = −82.70 | D3 = 0.15 | | |
| | R4 = 26.94 | D4 = 2.8 | N3 = 1.62299 | ν3 = 58.2 |
| | R5 = 52.37 | D5 = Variable | | |
| II | R6 = −126.00 | D6 = 1.00 | N4 = 1.77250 | ν4 = 49.6 |
| | R7 = 16.21 | D7 = 2.88 | | |
| | R8 = −24.86 | D8 = 1.0 | N5 = 1.6968 | ν5 = 55.5 |
| | R9 = 16.83 | D9 = 3.5 | N6 = 1.84666 | ν6 = 23.9 |
| | R10 = 886.33 | D10 = Variable | | |
| | R11 = Stop | D11 = Variable | | |
| III | R12 = 101.08 | D12 = 3.2 | N7 = 1.71300 | ν7 = 53.8 |
| | R13 = −32.81 | D13 = 0.15 | | |
| | R14 = 32.19 | D14 = 4.6 | N8 = 1.69680 | ν8 = 55.5 |
| | R15 = −24.48 | D15 = 1.0 | N9 = 1.84666 | ν9 = 23.9 |
| | R16 = −280.56 | D16 = Variable | | |
| IV-1 | R17 = −18.73 | D17 = 1.0 | N10 = 1.60311 | ν10 = 60.7 |
| | R18 = 339.07 | D18 = 7.01 | | |
| IV-2 | R19 = 62.92 | D19 = 4.3 | N11 = 1.69680 | ν11 = 55.5 |
| | R20 = −26.84 | D20 = 0.15 | | |
| | R21 = 19.50 | D21 = 1.0 | N12 = 1.84666 | ν12 = 23.9 |
| | R22 = 11.89 | D22 = 1.41 | | |
| | R23 = 18.74 | D23 = 4.3 | N13 = 1.71300 | ν13 = 53.8 |
| | R24 = −91.08 | D24 = 5.0 | | |
| | R25 = ∞ | D25 = 5.5 | N14 = 1.51633 | ν14 = 64.1 |
| | R26 = ∞ | | | |

| F | 8.3 | 45.84 |
|---|---|---|
| D5 | 2.1140 | 20.039 |
| D10 | 22.838 | 4.914 |
| D11 | 13.701 | 1.068 |
| D16 | 3.800 | 16.433 |

$f4\text{-}1 = -29.41$
$f4\text{-}2 = 18.83$

Numerical Example 8

F = 10.4–57.6  FNO = 1:1.20–1.70  2ω = 56.4°–11.1°

| | | | | |
|---|---|---|---|---|
| I | R1 = 172.71 | D1 = 2.25 | N1 = 1.80518 | ν1 = 25.4 |
| | R2 = 43.6 | D2 = 8.8 | N2 = 1.60311 | ν2 = 60.7 |
| | R3 = −85.13 | D3 = 0.15 | | |
| | R4 = 30.91 | D4 = 3.8 | N3 = 1.62299 | ν3 = 58.2 |
| | R5 = 65.49 | D5 = Variable | | |
| II | R6 = 203.42 | D6 = 1.2 | N4 = 1.69680 | ν4 = 55.5 |
| | R7 = 18.28 | D7 = 4.3 | | |
| | R8 = −22.25 | D8 = 1.05 | N5 = 1.69680 | ν5 = 55.5 |
| | R9 = 22.26 | D9 = 3.2 | N6 = 1.84666 | ν6 = 23.9 |
| | R10 = 175.74 | D10 = Variable | | |
| | R11 = Stop | D11 = Variable | | |
| III | R12 = 4913.99 | D12 = 3.3 | N7 = 1.74950 | ν7 = 35.3 |
| | R13 = −34.63 | D13 = 0.15 | | |
| | R14 = 37.25 | D14 = 6.2 | N8 = 1.62299 | ν8 = 58.2 |
| | R15 = −24.96 | D15 = 1.18 | N9 = 1.84666 | ν9 = 23.9 |
| | R16 = −61.95 | D16 = Variable | | |

-continued

Numerical Example 8

| | | | | |
|---|---|---|---|---|
| IV-1 | R17 = −21.24<br>R18 = −480.10 | D17 = 1.2<br>D18 = 8.2 | N10 = 1.59270 | ν10 = 35.3 |
| IV-2 | R19 = −449.16<br>R20 = −26.86<br>R21 = 47.81<br>R22 = 19.77<br>R23 = 68.25<br>R24 = −42.60<br>R25 = 22.85<br>R26 = 360.36<br>R27 = ∞<br>R28 = ∞ | D19 = 4.55<br>D20 = 0.15<br>D21 = 1.3<br>D22 = 2.9<br>D23 = 4.2<br>D24 = 0.15<br>D25 = 4.2<br>D26 = 5.0<br>D27 = 5.0 | N11 = 1.7130C<br><br>N12 = 1.84666<br><br>N13 = 1.60311<br><br>N14 = 1.51633<br><br>N15 = 1.51633 | ν11 = 53.8<br><br>ν12 = 23.9<br><br>ν13 = 60.7<br><br>ν14 = 64.1<br><br>ν15 = 64.1 |

| F | 10.44 | 57.57 |
|---|---|---|
| D5 | 1.550 | 21.270 |
| D10 | 22.841 | 3.121 |
| D11 | 17.102 | 2.844 |
| D16 | 4.485 | 18.743 | f4-1 = −37.55
f4-2 = 23.19

Numerical Example 9

F = 10.5   57.9   FNO = 1:1.20-1.7   2ω = 56.3°-11.0°

| | | | | |
|---|---|---|---|---|
| I | R1 = 176.89<br>R2 = 48.64<br>R3 = −85.44<br>R4 = 32.26<br>R5 = 97.78 | D1 = 2.3<br>D2 = 8.2<br>D3 = 0.15<br>D4 = 4.1<br>D5 = Variable | N1 = 1.80518<br>N2 = 1.51633<br><br>N3 = 1.63854 | ν1 = 25.4<br>ν2 = 64.1<br><br>ν3 = 55.4 |
| II | R6 = −118.54<br>R7 = 17.62<br>R8 = −25.15<br>R9 = 20.77<br>R10 = 334.24<br>R11 = Stop | D6 = 1.2<br>D7 = 3.8<br>D8 = 1.1<br>D9 = 3.6<br>D10 = Variable<br>D11 = Variable | N4 = 1.78590<br><br>N5 = 1.60311<br>N6 = 1.84666 | ν4 = 44.2<br><br>ν5 = 60.7<br>ν6 = 23.9 |
| III | R12 = 146.27<br>R13 = −29.62<br>R14 = 35.85<br>R15 = −25.88<br>R16 = −173.81 | D12 = 4.1<br>D13 = 0.15<br>D14 = 6.0<br>D15 = 1.3<br>D16 = Variable | N7 = 1.65844<br><br>N8 = 1.65844<br>N9 = 1.84666 | ν7 = 50.9<br><br>ν8 = 50.9<br>ν9 = 23.9 |
| IV-1 | R17 = −19.86<br>R18 = 117.72 | D17 = 1.2<br>D18 = 7.6 | N10 = 1.51633 | ν10 = 64.1 |
| IV-2 | R19 = 102.99<br>R20 = −27.17<br>R21 = 110.25<br>R22 = 19.40<br>R23 = 1604.82<br>R24 = −29.39<br>R25 = 20.64<br>R26 = −425.86<br>R27 = ∞<br>R28 = ∞ | D19 = 4.6<br>D20 = 3.08<br>D21 = 1.2<br>D22 = 3.4<br>D23 = 3.4<br>D24 = 0.15<br>D25 = 5.4<br>D26 = 2.0<br>D27 = 5.5 | N11 = 1.65844<br><br>N12 = 1.84666<br><br>N13 = 1.62299<br><br>N14 = 1.62299<br><br>N15 = 1.51633 | ν11 = 50.9<br><br>ν12 = 23.9<br><br>ν13 = 58.2<br><br>ν14 = 58.2<br><br>ν15 = 64.1 |

| F | 10.46 | 57.92 |
|---|---|---|
| D5 | 2.1860 | 22.771 |
| D10 | 22.888 | 2.932 |
| D11 | 16.349 | 2.493 |
| D16 | 4.025 | 18.081 | f4-1 = −32.82
f4-2 = 22.42

Numerical Example 10

F = 10.8-81.8   FNO = 1:1.60-1.80   2ω = 54.8°-7.8°

| | | | | |
|---|---|---|---|---|
| I | R1 = 159.99<br>R2 = 48.72<br>R3 = −106.25<br>R4 = 31.35<br>R5 = 63.09 | D1 = 2.2<br>D2 = 8.0<br>D3 = 0.15<br>D4 = 4.3<br>D5 = Variable | N1 = 1.80518<br>N2 = 1.60311<br><br>N3 = 1.62299 | ν1 = 25.4<br>ν2 = 60.7<br><br>ν3 = 58.2 |
| II | R6 = −100.99<br>R7 = 19.74<br>R8 = −31.02 | D6 = 1.1<br>D7 = 4.26<br>D8 = 1.0 | N4 = 1.77250<br><br>N5 = 1.69680 | ν4 = 49.6<br><br>ν5 = 55.5 |

-continued

Numerical Example 10

| | | | | |
|---|---|---|---|---|
| | R9 = 19.71 | D9 = 4.0 | N6 = 1.84666 | ν6 = 23.9 |
| | R10 = 170.54 | D10 = Variable | | |
| | R11 = Stop | D11 = Variable | | |
| III | R12 = 160.59 | D12 = 1.2 | N7 = 1.84666 | ν7 = 23.9 |
| | R13 = 29.84 | D13 = 6.0 | N8 = 1.69350 | ν8 = 53.2 |
| | R14 = −35.49 | D14 = 0.15 | | |
| | R15 = 43.14 | D15 = 4.0 | N9 = 1.77250 | ν9 = 49.6 |
| | R16 = −115.44 | D16 = Variable | | |
| IV-1 | R17 = −27.55 | D17 = 1.2 | N10 = 1.77250 | ν10 = 49.6 |
| | R18 = 99.14 | D18 = 8.15 | | |
| | R19 = 664.99 | D19 = 4.6 | N11 = 1.63636 | ν11 = 35.4 |
| | R20 = −28.70 | D20 = 10.93 | | |
| IV-2 | R21 = −487.44 | D21 = 1.2 | N12 = 1.84666 | ν12 = 23.9 |
| | R22 = 24.54 | D22 = 0.48 | | |
| | R23 = 30.12 | D23 = 6.0 | N13 = 1.48749 | ν13 = 70.2 |
| | R24 = −26.61 | D24 = 0.15 | | |
| | R25 = 21.22 | D25 = 4.3 | N14 = 1.48749 | ν14 = 70.2 |
| | R26 = −981.01 | D26 = 5.0 | | |
| | R27 = ∞ | D27 = 5.0 | N15 = 1.51633 | ν15 = 64.1 |
| | R28 = ∞ | | | |

| F | 10.80 | 81.82 |
|---|---|---|
| D5 | 1.997 | 26.338 |
| D10 | 25.223 | 0.882 |
| D11 | 16.787 | 1.036 |
| D16 | 5.000 | 20.751 | f4-1 = −288.78
f4-2 = 38.37

Numerical Example 11

F = 10.3−57.0  FNO = 1:1.20−1.70  2ω = 57.0°−11.2°

| | | | | |
|---|---|---|---|---|
| I | R1 = 152.46 | D1 = 2.25 | N1 = 1.80518 | ν1 = 25.4 |
| | R2 = 41.36 | D2 = 8.8 | N2 = 1.60311 | ν2 = 60.7 |
| | R3 = −85.05 | D3 = 0.15 | | |
| | R4 = 30.41 | D4 = 3.8 | N3 = 1.62299 | ν3 = 58.2 |
| | R5 = 60.91 | D5 = Variable | | |
| II | R6 = 203.44 | D6 = 1.1 | N4 = 1.69680 | ν4 = 55.5 |
| | R7 = 18.43 | D7 = 4.3 | | |
| | R8 = −21.78 | D8 = 1.0 | N5 = 1.69680 | ν5 = 55.5 |
| | R9 = 21.78 | D9 = 3.2 | N6 = 1.84666 | ν6 = 23.9 |
| | R10 = 184.02 | D10 = Variable | | |
| | R11 = Stop | D11 = Variable | | |
| III | R12 = −474.39 | D12 = 3.3 | N7 = 1.74950 | ν7 = 35.3 |
| | R13 = −33.26 | D13 = 0.15 | | |
| | R14 = 39.4 | D14 = 6.2 | N8 = 1.62299 | ν8 = 58.2 |
| | R15 = −23.23 | D15 = 1.18 | N9 = 1.84666 | ν9 = 23.9 |
| | R16 = −52.34 | D16 = Variable | | |
| IV-1 | R17 = −24.76 | D17 = 1.2 | N10 = 1.59270 | ν10 = 35.3 |
| | R18 = 308.42 | D18 = 0.24 | | |
| | R19 = 275.06 | D19 = 3.4 | N11 = 1.74400 | ν11 = 44.7 |
| | R20 = −181.12 | D20 = 10.0 | | |
| IV-2 | R21 = −149.24 | D21 = 4.6 | N12 = 1.72000 | ν12 = 50.2 |
| | R22 = −28.86 | D22 = 0.15 | | |
| | R23 = 73.25 | D23 = 1.3 | N13 = 1.84666 | ν13 = 23.9 |
| | R24 = 19.7 | D24 = 2.95 | | |
| | R25 = 65.08 | D25 = 3.85 | N14 = 1.64000 | ν14 = 60.1 |
| | R26 = −40.45 | D26 = 0.15 | | |
| | R27 = 19.32 | D27 = 3.95 | N15 = 1.60311 | ν15 = 60.7 |
| | R28 = 218.42 | D28 = 5.0 | | |
| | R29 = ∞ | D29 = 5.5 | N16 = 1.51633 | ν16 = 64.1 |
| | R30 = ∞ | | | |

| F | 10.32 | 57.00 |
|---|---|---|
| D5 | 1.365 | 21.085 |
| D10 | 23.000 | 3.280 |
| D11 | 16.688 | 2.390 |
| D16 | 4.497 | 18.795 | f4-1 = −53.39
f4-2 = 22.20

Numerical Example 12

F = 1−5.52  FNO = 1:1.425−1.75  2ω = 51.4°−10.0°

-continued

Numerical Example 12

| R1 = 15.1717 | D1 = 0.1928 | N1 = 1.80518 | ν1 = 25.4 |

-continued

Numerical Example 12

| | | | |
|---|---|---|---|
| R2 = 5.0971 | D2 = 0.6506 | N2 = 1.60311 | ν2 = 60.7 |
| R3 = −10.0692 | D3 = 0.0181 | | |
| R4 = 3.2671 | D4 = 0.3614 | N3 = 1.62299 | ν3 = 58.2 |
| R5 = 6.3240 | D5 = Variable | | |
| R6 = −14.6297 | D6 = 0.1205 | N4 = 1.77250 | ν4 = 49.6 |
| R7 = 1.9562 | D7 = 0.3460 | | |
| R8 = −3.0111 | D8 = 0.1205 | N5 = 1.69680 | ν5 = 55.5 |
| R9 = 2.0179 | D9 = 0.4217 | N6 = 1.84666 | ν6 = 23.9 |
| R10 = 104.2199 | D10 = Variable | | |
| R11 = Stop | D11 = Variable | | |
| R12 = 11.7622 | D12 = 0.3855 | N7 = 1.71300 | ν7 = 53.8 |
| R13 = −3.9049 | D13 = 0.0181 | | |
| R14 = 3.8392 | D14 = 0.5542 | N8 = 1.69680 | ν8 = 55.5 |
| R15 = −2.9425 | D15 = 0.1205 | N9 = 1.84666 | ν9 = 23.9 |
| R16 = −47.3102 | D16 = Variable | | |
| R17 = −2.2482 | D17 = 0.1205 | N10 = 1.60311 | ν10 = 60.7 |
| R18 = 36.2018 | D18 = 0.8447 | | |
| R19 = 6.7139 | D19 = 0.5181 | N11 = 1.69680 | ν11 = 55.5 |
| R20 = −3.3161 | D20 = 0.0181 | | |
| R21 = 2.5036 | D21 = 0.1205 | N12 = 1.84666 | ν12 = 23.9 |
| R22 = 1.4558 | D22 = 0.1743 | | |
| R23 = 2.3658 | D23 = 0.5181 | N13 = 1.77250 | ν13 = 49.6 |
| R24 = −11.5514 | D24 = 0.6024 | | |
| R25 = ∞ | D25 = 0.6627 | N14 = 1.51633 | ν14 = 64.1 |
| R26 = ∞ | | | |

| F | 1 | 2.59 | 5.52 |
|---|---|---|---|
| D5 | 0.2560 | 1.7018 | 2.4156 |
| D10 | 2.7509 | 1.3051 | 0.5914 |
| D11 | 1.6594 | 0.9502 | 0.1374 |
| D16 | 0.4578 | 1.1671 | 1.9798 |

$f4-1 = -3.5056$
$f4-2 = 2.2467$

Numerical Example 13

F = 1−5.52   FNO = 1:1.25−1.77   2ω = 51.6°−10°

| | | | |
|---|---|---|---|
| R1 = 16.1923 | D1 = 0.2171 | N1 = 1.80518 | ν1 = 25.4 |
| R2 = 5.1674 | D2 = 0.6936 | N2 = 1.51633 | ν2 = 64.1 |
| R3 = −8.8452 | D3 = 0.0181 | | |
| R4 = 3.2259 | D4 = 0.3559 | N3 = 1.63854 | ν3 = 55.4 |
| R5 = 7.8033 | D5 = Variable | | |
| R6 = −10.8380 | D6 = 0.1206 | N4 = 1.78590 | ν4 = 44.2 |
| R7 = 1.8100 | D7 = 0.3607 | | |
| R8 = −3.2322 | D8 = 0.1086 | N5 = 1.60311 | ν5 = 60.7 |
| R9 = 1.9383 | D9 = 0.3800 | N6 = 1.84666 | ν6 = 23.9 |
| R10 = 18.3253 | D10 = Variable | | |
| R11 = Stop | D11 = Variable | | |
| R12 = 8.0362 | D12 = 0.4463 | N7 = 1.65844 | ν7 = 50.9 |
| R13 = −3.3229 | D13 = 0.0181 | | |
| R14 = 3.3031 | D14 = 0.6152 | N8 = 1.65844 | ν8 = 50.9 |
| R15 = −2.6940 | D15 = 0.1206 | N9 = 1.84666 | ν9 = 23.9 |
| R16 = 32.6153 | D16 = Variable | | |
| R17 = −1.9274 | D17 = 0.1206 | N10 = 1.51633 | ν10 = 64.1 |
| R18 = 12.2160 | D18 = 0.8974 | | |
| R19 = 8.6309 | D19 = 0.4222 | N11 = 1.65844 | ν11 = 50.9 |
| R20 = −2.7877 | D20 = 0.0181 | | |
| R21 = 2.4131 | D21 = 0.1206 | N12 = 1.84666 | ν12 = 23.9 |
| R22 = 1.4212 | D22 = 0.1435 | | |
| R23 = 2.2034 | D23 = 0.4584 | N13 = 1.69680 | ν13 = 55.5 |
| R24 = −6.8488 | D24 = 0.2413 | | |
| R25 = ∞ | D25 = 0.6634 | N14 = 1.51633 | ν14 = 64.1 |
| R26 = ∞ | | | |

| F | 1 | 2.74 | 5.52 |
|---|---|---|---|
| D5 | 0.2589 | 1.7667 | 2.4152 |
| D10 | 2.7421 | 1.2343 | 0.5858 |
| D11 | 1.6550 | 0.8987 | 0.1426 |
| D16 | 0.4584 | 1.2146 | 1.9708 |

-continued

Numerical Example 13

$f4-1 = -3.2149$
$f4-2 = -2.1368$

Numerical Example 14

F = 1−5.52   FNO = 1:1.25−1.75   2ω = 56.4°−11.0°

| | | | |
|---|---|---|---|
| R1 = 16.3271 | D1 = 0.2153 | N1 = 1.80518 | ν1 = 25.4 |
| R2 = 4.1903 | D2 = 0.8419 | N2 = 1.60311 | ν2 = 60.7 |
| R3 = −8.2045 | D3 = 0.0144 | | |
| R4 = 2.9687 | D4 = 0.3636 | N3 = 1.62299 | ν3 = 58.2 |
| R5 = 6.3151 | D5 = Variable | | |
| R6 = 19.4638 | D6 = 0.1052 | N4 = 1.69680 | ν4 = 55.5 |
| R7 = 1.7490 | D7 = 0.4114 | | |
| R8 = −2.1231 | D8 = 0.0957 | N5 = 1.69680 | ν5 = 55.5 |
| R9 = 2.1236 | D9 = 0.3061 | N6 = 1.84666 | ν6 = 23.9 |
| R10 = 17.1111 | D10 = Variable | | |
| R11 = Stop | D11 = Variable | | |
| R12 = 111.1357 | D12 = 0.3157 | N7 = 1.74950 | ν7 = 35.3 |
| R13 = −3.3613 | D13 = 0.0144 | | |
| R14 = 3.6305 | D14 = 0.5932 | N8 = 1.62299 | ν8 = 58.2 |
| R15 = −2.3417 | D15 = 0.1129 | N9 = 1.84666 | ν9 = 23.9 |
| R16 = −5.7841 | D16 = Variable | | |
| R17 = −2.0491 | D17 = 0.1148 | N10 = 1.59270 | ν10 = 35.3 |
| R18 = 24.8116 | D18 = 0.7845 | | |
| R19 = −56.2850 | D19 = 0.4401 | N11 = 1.72000 | ν11 = 50.2 |
| R20 = −2.6179 | D20 = 0.0144 | | |
| R21 = 5.6440 | D21 = 0.1244 | N12 = 1.84666 | ν12 = 23.9 |
| R22 = 1.9298 | D22 = 0.2822 | | |
| R23 = 7.6877 | D23 = 0.3683 | N13 = 1.64000 | ν13 = 60.1 |
| R24 = −3.9225 | D24 = 0.0144 | | |
| R25 = 2.3208 | D25 = 0.3779 | N14 = 1.60311 | ν14 = 60.7 |
| R26 = 19.0217 | D26 = 0.4784 | | |
| R27 = ∞ | D27 = 0.4784 | N15 = 1.51633 | ν15 = 64.1 |
| R28 = ∞ | | | |

| F | 1.00 | 3.10 | 5.52 |
|---|---|---|---|
| D5 | 0.1530 | 1.5880 | 2.0396 |
| D10 | 2.1992 | 0.7642 | 0.3126 |
| D11 | 1.6231 | 0.8344 | 0.2552 |
| D16 | 0.4302 | 1.2189 | 1.7981 |

$f4-1 = -3.7756$
$f4-2 = 2.2396$

Numerical Example 15

F = 1−5.52   FNO = 1:1.25−1.78   2ω = 56.4°−11.0°

| | | | |
|---|---|---|---|
| R1 = 16.5397 | D1 = 0.2201 | N1 = 1.80518 | ν1 = 25.4 |
| R2 = 4.6294 | D2 = 0.7847 | N2 = 1.51633 | ν2 = 64.1 |
| R3 = −8.3162 | D3 = 0.0144 | | |
| R4 = 3.1504 | D4 = 0.3923 | N3 = 1.63854 | ν3 = 55.4 |
| R5 = 10.0607 | D5 = Variable | | |
| R6 = −12.4582 | D6 = 0.1148 | N4 = 1.78590 | ν4 = 44.2 |
| R7 = 1.6793 | D7 = 0.3636 | | |
| R8 = −2.3591 | D8 = 0.1053 | N5 = 1.60311 | ν5 = 60.7 |
| R9 = 1.9954 | D9 = 0.3445 | N6 = 1.84666 | ν6 = 23.9 |
| R10 = 33.9903 | D10 = Variable | | |
| R11 = Stop | D11 = Variable | | |
| R12 = 13.9294 | D12 = 0.3923 | N7 = 1.65844 | ν7 = 50.9 |
| R13 = −2.8614 | D13 = 0.0144 | | |
| R14 = 3.4504 | D14 = 0.5742 | N8 = 1.65844 | ν8 = 50.9 |
| R15 = −2.4751 | D15 = 0.1244 | N9 = 1.84666 | ν9 = 23.9 |
| R16 = −15.4552 | D16 = Variable | | |
| R17 = −1.9267 | D17 = 0.1148 | N10 = 1.51633 | ν10 = 64.1 |
| R18 = 17.7685 | D18 = 0.7273 | | |
| R19 = 10.5337 | D19 = 0.4402 | N11 = 1.65844 | ν11 = 50.9 |
| R20 = −2.6152 | D20 = 0.2947 | | |

Numerical Example 15 (continued)

| | | | |
|---|---|---|---|
| R21 = 8.5295 | D21 = 0.1148 | N12 = 1.84666 | $\nu$12 = 23.9 |
| R22 = 1.7630 | D22 = 0.3254 | | |
| R23 = 26.8853 | D23 = 0.3254 | N13 = 1.62299 | $\nu$13 = 58.2 |
| R24 = −2.9308 | D24 = 0.0144 | | |
| R25 = 1.9921 | D25 = 0.5167 | N14 = 1.62299 | $\nu$14 = 58.2 |
| R26 = −338.6609 | D26 = 0.4785 | | |
| R27 = ∞ | D27 = 0.5263 | N15 = 1.51633 | $\nu$15 = 64.1 |
| R28 = ∞ | | | |

| F | 1.00 | 2.76 | 5.52 |
|---|---|---|---|
| D5 | 0.2701 | 1.6098 | 2.1797 |
| D10 | 2.0893 | 0.7496 | 0.1797 |
| D11 | 1.6853 | 1.0109 | 0.3438 |
| D16 | 0.3828 | 1.0572 | 1.7242 | f4-1 = −3.3599
f4-2 = −2.1681

Numerical Example 16

F = 1-7.6   FNO = 1:1.45-1.97   2$\omega$ = 53.4°-7.6°

| | | | |
|---|---|---|---|
| R1 = 9.0182 | D1 = 0.2155 | N1 = 1.80518 | $\nu$1 = 25.4 |
| R2 = 3.6301 | D2 = 0.7182 | N2 = 1.60311 | $\nu$2 = 60.7 |
| R3 = −466.7563 | D3 = 0.0135 | | |
| R4 = 4.0205 | D4 = 0.5746 | N3 = 1.69680 | $\nu$3 = 55.5 |
| R5 = 32.3816 | D5 = Variable | | |
| R6 = ∞ | D6 = 0.0988 | N4 = 1.77250 | $\nu$4 = 49.6 |
| R7 = 1.6411 | D7 = 0.4182 | | |
| R8 = −2.2175 | D8 = 0.0898 | N5 = 1.77250 | $\nu$5 = 49.6 |
| R9 = 1.8445 | D9 = 0.4040 | N6 = 1.84666 | $\nu$6 = 23.9 |
| R10 = −39.4252 | D10 = Variable | | |
| R11 = 29.6558 | D11 = 0.1257 | N7 = 1.84666 | $\nu$7 = 23.9 |
| R12 = 2.4178 | D12 = 0.8080 | N8 = 1.69350 | $\nu$8 = 53.2 |
| R13 = −3.4184 | D13 = 0.0135 | | |
| R14 = 3.7126 | D14 = 0.4489 | N9 = 1.77250 | $\nu$9 = 49.6 |
| R15 = −172.6061 | D15 = Variable | | |
| R16 = Stop | D16 = 0.3477 | | |
| R17 = −2.5609 | D17 = 0.1077 | N10 = 1.69680 | $\nu$10 = 55.5 |
| R18 = −20.1238 | D18 = 0.8890 | | |
| R19 = −12.0853 | D19 = 0.4040 | N11 = 1.64769 | $\nu$11 = 33.8 |
| R20 = −2.4900 | D20 = 0.6550 | | |
| R21 = −15.7120 | D21 = 0.0898 | N12 = 1.84666 | $\nu$12 = 23.9 |
| R22 = 1.8773 | D22 = 0.1622 | | |
| R23 = 5.8664 | D23 = 0.3591 | N13 = 1.48749 | $\nu$13 = 70.2 |
| R24 = −2.0975 | D24 = 0.0135 | | |
| R25 = 1.8748 | D25 = 0.4040 | N14 = 1.48749 | $\nu$14 = 70.2 |
| R26 = −9.4738 | D26 = 0.4489 | | |
| R27 = ∞ | D27 = 0.5387 | N15 = 1.51633 | $\nu$15 = 64.1 |
| R28 = ∞ | | | |

| F | 1.00 | 2.48 | 7.60 |
|---|---|---|---|
| D5 | 0.169 | 1.516 | 2.454 |
| D10 | 4.734 | 2.812 | 0.803 |
| D15 | 0.467 | 1.042 | 2.114 | f4-1 = −4.2217
f4-2 = 2.8228

Numerical Example 17

F = 1-7.61   FNO = 1:1.45-1.97   2$\omega$ = 51.4°-7.2°

| | | | |
|---|---|---|---|
| R1 = 8.4913 | D1 = 0.2063 | N1 = 1.80518 | $\nu$1 = 25.4 |
| R2 = 3.5392 | D2 = 0.6876 | N2 = 1.60311 | $\nu$2 = 60.7 |
| R3 = −347.8193 | D3 = 0.0129 | | |
| R4 = 3.9690 | D4 = 0.5501 | N3 = 1.69680 | $\nu$3 = 55.5 |
| R5 = 35.4997 | D5 = Variable | | |
| R6 = 24.8261 | D6 = 0.0945 | N4 = 1.77250 | $\nu$4 = 49.6 |
| R7 = 1.7915 | D7 = 0.4003 | | |
| R8 = −2.4276 | D8 = 0.0859 | N5 = 1.77250 | $\nu$5 = 49.6 |
| R9 = 1.6691 | D9 = 0.3868 | N6 = 1.84666 | $\nu$6 = 23.9 |
| R10 = 8.8759 | D10 = Variable | | |
| R11 = 29.2530 | D11 = 0.1203 | N7 = 1.84666 | $\nu$7 = 23.9 |
| R12 = 3.2585 | D12 = 0.7735 | N8 = 1.69350 | $\nu$8 = 53.2 |
| R13 = −3.2590 | D13 = 0.0129 | | |
| R14 = 3.4123 | D14 = 0.4297 | N9 = 1.77250 | $\nu$9 = 49.6 |
| R15 = 142.4386 | D15 = Variable | | |
| R16 = Stop | D16 = 0.3400 | | |
| R17 = −2.2712 | D17 = 0.1031 | N10 = 1.69680 | $\nu$10 = 55.5 |
| R18 = 117.6700 | D18 = 0.4788 | | |
| R19 = −5.0501 | D19 = 0.3868 | N11 = 1.68893 | $\nu$11 = 31.1 |
| R20 = −2.1241 | D20 = 1.2921 | | |
| R21 = −12.0468 | D21 = 0.0859 | N12 = 1.84666 | $\nu$12 = 23.9 |
| R22 = 2.0094 | D22 = 0.0452 | | |
| R23 = 3.4921 | D23 = 0.3438 | N13 = 1.48749 | $\nu$13 = 70.2 |
| R24 = −1.8264 | D24 = 0.0129 | | |
| R25 = 1.8865 | D25 = 0.3868 | N14 = 1.48749 | $\nu$14 = 70.2 |
| R26 = −17.7691 | D26 = 0.4297 | | |
| R27 = ∞ | D27 = 0.5157 | N15 = 1.51633 | $\nu$15 = 64.1 |
| R28 = ∞ | | | |

| F | 1.00 | 2.48 | 7.61 |
|---|---|---|---|
| D5 | 0.1087 | 1.3979 | 2.2957 |
| D10 | 4.6037 | 2.7635 | 0.8401 |
| D15 | 0.4469 | 0.9980 | 2.0235 | f4-1 = −17.1895
f4-2 = 3.8417

According to the invention, a high range compact zoom lens which enables a shortening of the total length and a shortening of the diameter of the first unit to be achieved with achievement of a reduction of the weight of the entire system.

Also, in the invention, even if the angular field is widened, the height of incidence of the oblique pencil on the first unit in the wide angle end can be relatively low, whereby the diameter of the first unit is prevented from increasing. Further, since the effective diameters of the third and fourth units behind the diaphragm are not so much increased, a wide angle compact zoom lens which enables the entire lens system to be reduced can be easily realized.

Also, because the position responsivity of each lens unit becomes small, the assembly can be made easy. Further, as the telephoto setting of narrow angular field is often used in outdoor photography, if the F-number in the telephoto end is regulated so as not to be an obstacle in actual practice, the diameter of the first unit can be controlled. Thus, a compact zoom lens can be easily achieved.

What is claimed is:

1. A zoom lens comprising, from front to rear, a first lens unit of positive refractive power for focusing, a second lens unit of negative refractive power which, when zooming, moves monotonously, a third lens unit of positive refractive power which, when zooming, moves monotonously in the opposite direction to that of movement of said second lens unit, and a fixed fourth lens unit of positive refractive power having an image forming function, with a diaphragm for varying the F-number being fixedly positioned between said second lens unit and said third lens unit, said zoom lens satisfying the following condition:

$$0.4 < ls/lw < 0.75$$

where lw is the axial separation between said second and said third lens units in the wide angle end of the zooming range, and ls is the axial separation between said second lens unit and said diaphragm in the wide angle end of the zooming range.

2. A zoom lens according to claim 1, satisfying the following condition:

$$0.5 < |\eta/\xi| < 1.3$$

where $\xi$ and $\eta$ are the total zooming movements of said second and said third lens units respectively.

3. A zoom lens according to claim 1, wherein the rays travelling from said third lens unit to said fourth lens unit are convergent at any station of zooming, and said fourth lens unit has a front sub-unit of negative refractive power and a rear sub-unit of positive refractive power, said front sub-unit including at least one negative lens facing its concave surface toward the front, and said rear sub-unit including one negative lens facing its concave surface toward the rear and at least two positive lenses, whereby the following conditions are satisfied:

$$1.74 < |R_{1N}/f_W| < 2.82, R_{1N} < 0$$

$$1.28 < R_{2N}/f_W < 2.2$$

$$1.69 < R_{2P}/f_W < 2.6$$

$$0.65 < d/f_W < 1.42$$

where $R_{1N}$ is the radius of curvature of the one of the forwardly concave surfaces in said front sub-unit which is of strongest curvature, $R_{2N}$ is the radius of curfature of the one of the rearwardly concave surfaces in said rear sub-unit which is of strongest curvature, $R_{2P}$ is the radius of curvature of the one of the forwardly convex surfaces of the positive lenses on the image side of said negative lens in said rear sub-unit which is of strongest curvature, d is the air separation between said front sub-unit and said rear sub-unit, and $f_W$ is the shortest focal length of the entire system.

4. A zoom lens comprising, from front to rear, a first lens unit of positive refractive power for focusing, a second lens unit of negative refractive power which, when zooming, moves monotonously, a third lens unit of positive refractive power which, when zooming, moves monotonously in the opposite direction to that of movement of said second lens unit, and a fixed fourth lens unit of positive refractive power having an image forming function, with a diaphragm for varying the F-number being fixedly positioned between said second lens unit and said third lens unit, said zoom lens satisfying the following condition:

$$1 < |f_3/f_2| < 3$$

where $f_2$ and $f_3$ are the focal lengths of the second and third lens units respectively.

5. A zoom lens comprising, from front to rear, a first lens unit of positive refractive power for focusing, a second lens unit of negative refractive power which, when zooming, moves monotonously, a third lens unit of positive refractive power which, when zooming, moves monotonously in the opposite direction to that of movement of said second lens unit, and a fixed fourth lens unit of positive refractive power having an image forming function, with a diaphragm for varying the F-number being fixedly positioned between said second lens unit and said third lens unit, wherein said fourth lens unit is constructed from a front sub-unit of negative refractive power, and a rear sub-unit of positive refractive power.

6. A zoom lens according to claim 5, satisfying the following condition:

$$1.3 < |f_{4-1}/f_{4-2}| < 8.0$$

where $f_{4-1}$ and $f_{4-2}$ are the focal lengths of said front and said rear sub-units.

7. A zoom lens according to claim 6, wherein said front sub-unit includes at least one negative lens facing its concave surface toward the front, and said rear sub-unit includes one negative lens facing its concave surface toward the rear and at least two positive lenses.

* * * * *

UNITED STATES PATENT AND TRADEMARK OFFICE
CERTIFICATE OF CORRECTION

PATENT NO. : 4,763,998

DATED : August 16, 1988

INVENTOR(S) : SADAHIKO TSUJI, ET AL.

It is certified that error appears in the above-identified patent and that said Letters Patent is hereby corrected as shown below:

Column 3, line 44, "4-st lens unit" should read --4-1st lens unit--;

line 53, "$1.74 < |R_{1H}/f_W| < 2.82, R_{1N} < 0$" should read --$1.74 < |R_{1N}/f_W| < 2.82, R_{1N} < 0$--.

Column 4, line 20, "unit 35" should read --unit 34--;

line 59, "enough of" should read --enough for--.

Column 5, line 24, "diameter" should read --the diameter--.

Column 6, line 40, " direction" should read --directions--.

Column 7, line 1, "much" should be deleted;

line 64, "for the" should read --for by the--.

Column 8, line 22, "improvements" should read --improvement--;

line 28, "made" should read --made to--;

line 37, "made" should read --made to--.

UNITED STATES PATENT AND TRADEMARK OFFICE
CERTIFICATE OF CORRECTION

PATENT NO. : 4,763,998

DATED : August 16, 1988

INVENTOR(S) : SADAHIKO TSUJI, ET AL.

It is certified that error appears in the above-identified patent and that said Letters Patent is hereby corrected as shown below:

Column 9,
    line 3, "necessarry" should read --necessary--.

Column 10,
    line 29, "The" should read --In the--;
    line 54, "curfature" should read --curvature--.

Column 15,
    Numerical Example 5, "C" should be deleted.

Column 19,
    Numerical Example 8, "N11 = 1.7130C" should read --N11 = 1.71300--;
    Numerical Example 9, "F = 10.5  57.9" should read --F = 10.5 - 57.9--.

Column 26,
    line 29, "to be" should read --can be--.

UNITED STATES PATENT AND TRADEMARK OFFICE
CERTIFICATE OF CORRECTION

PATENT NO. : 4,763,998            Sheet 3 of 3

DATED      : August 16, 1988

INVENTOR(S) : SADAHIKO TSUJI, ET AL.

It is certified that error appears in the above-identified patent and that said Letters Patent is hereby corrected as shown below:

Column 27, line 31, "curfature" should read --curvature--.

Signed and Sealed this

Seventh Day of March, 1989

Attest:

DONALD J. QUIGG

Attesting Officer      Commissioner of Patents and Trademarks